United States Patent [19]

DeShon

[11] 4,270,205
[45] May 26, 1981

[54] SERIAL LINE COMMUNICATION SYSTEM

[75] Inventor: Wallace E. DeShon, Bartlesville, Okla.

[73] Assignee: Phillips Petroleum Company, Bartlesville, Okla.

[21] Appl. No.: 15,687

[22] Filed: Feb. 27, 1979

[51] Int. Cl.³ ...................... G06F 11/10; G06F 11/14
[52] U.S. Cl. .......................................... 371/32; 371/5; 371/33
[58] Field of Search ........... 340/146.1 BA, 146.1 AX; 325/41, 42; 364/900; 371/32, 33, 2, 41, 5

[56] References Cited

U.S. PATENT DOCUMENTS

| 3,312,937 | 4/1967 | Van Duuren | 340/146.1 BA |
|---|---|---|---|
| 3,452,330 | 6/1969 | Avery | 340/146.1 BA |
| 3,593,281 | 7/1971 | Van Duuren et al. | 340/146.1 BA |
| 3,676,846 | 7/1972 | Busch | 340/146.1 BA |
| 3,747,074 | 7/1973 | Shulze | 364/900 |
| 3,754,211 | 8/1973 | Rocher et al. | 340/146.1 BA |
| 3,775,751 | 11/1973 | Anderson | 362/900 |
| 3,876,979 | 4/1975 | Winn et al. | 340/146.1 BA |
| 3,978,407 | 8/1976 | Forney, Jr. et al. | 340/146.1 AX |
| 4,082,922 | 4/1978 | Chu | 340/146.1 BA |
| 4,144,522 | 3/1979 | Kageyama et al. | 340/146.1 BA |

OTHER PUBLICATIONS

De Shon, Microprocessors Improve Serial Communication, Control Engineering, pp. 127–131, Mar. 1978.

*Primary Examiner*—Charles E. Atkinson

[57] ABSTRACT

A serial line communication system is provided whereby a plurality of remote units are tied to a central site through a serial communication line. Each remote unit is provided with an automatic bit rate detection means. Messages returning from the remotes are checked at the central site for errors. If errors occur, the central site automatically retries to achieve error-free communication. If necessary to achieve error-free communication, the central site is provided with means for automatically shifting to a lower secondary bit rate to achieve communications with a particular remote. The central site then shifts back to the higher primary bit rate for communication with the next remote.

28 Claims, 15 Drawing Figures

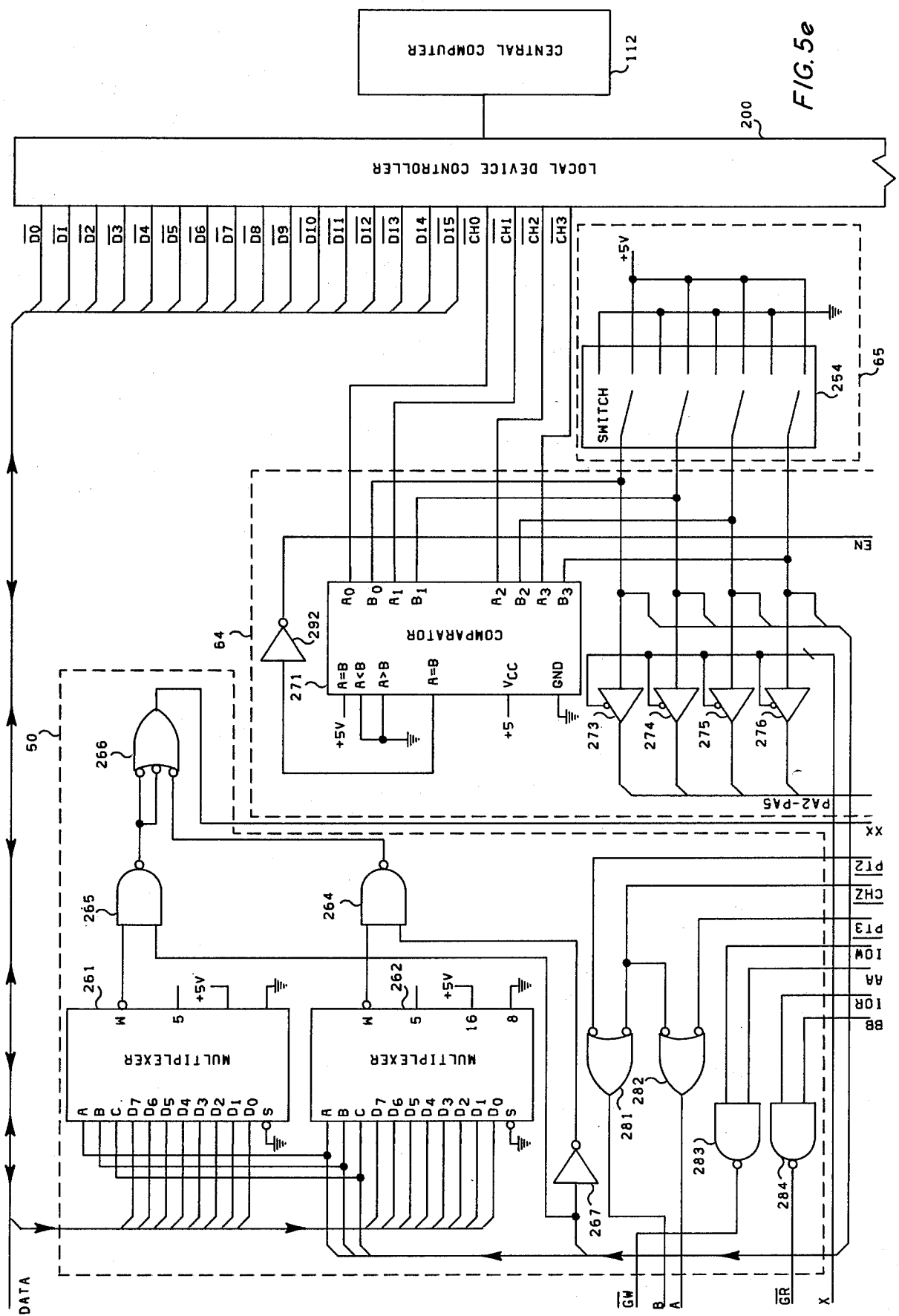

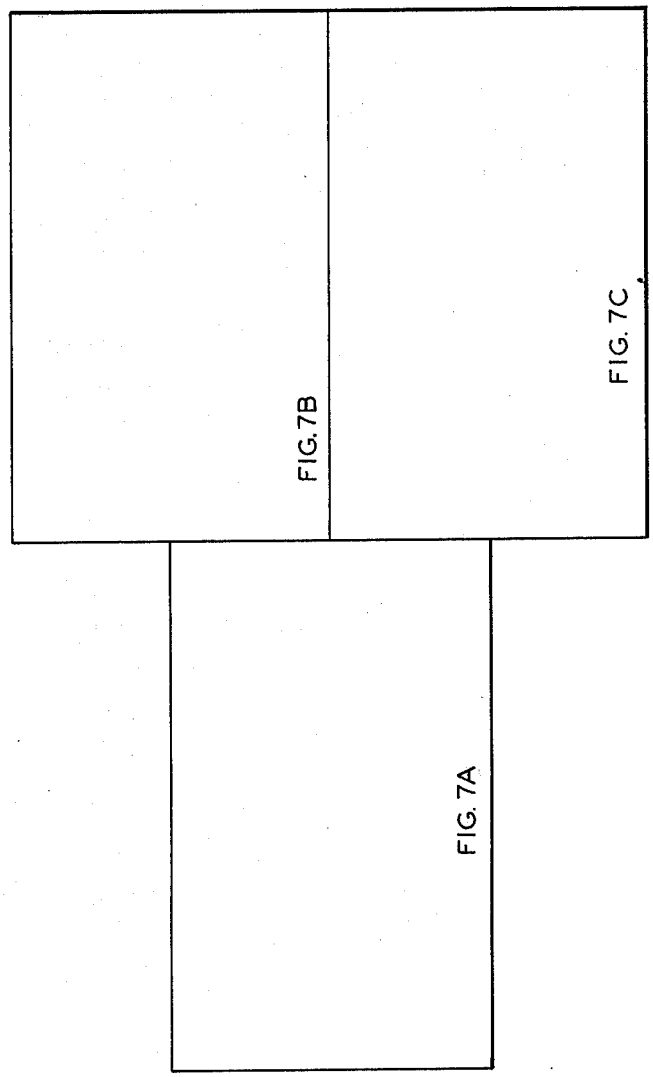

SERIAL LINE COMMUNICATION SYSTEM

This invention relates to serial line communication systems. In a particular aspect this invention relates to a method for increasing throughput and minimizing cost for a serial line communication system by operating at a prime baud rate and shifting to a lower secondary baud rate only when errors or transmission problems occur when data is transmitted at the prime baud rate.

The serial communication line has been the predominant choice for use in communication systems. The security, reliability, and cost effectiveness of the serial line usually offset its lower than parallel line speed. Serial communication systems come in two configurations: radial and party line.

The radial system provides for maximum throughput to each remote station. It is also the more expensive of the two systems since a separate communication line, a communication line controller, and modem is needed for each serial line. The party line organization, however, requires only one communication line controller and modem at the central computer, but it is slower than the radial system.

Both configurations require that each bit of data to be transmitted be placed on the serial line for a finite amount of time. The time required to transmit a message is the product of the time required for a single bit (bit rate) times the number of bits required to make up a message. Time per bit is the reciprocal of the bit rate. Thus, 43 consecutive bits at 1,200 bits per sec requires 0.0358 secs to be transmitted (1/1,200×43).

The number of remotes on a party line is limited by the amount of time required to communicate with each remote and the frequency with which each remote must be communicated. For example, assume that five remotes on a party line must be updated every second and the time required to up-date each remote is 0.072 second. Since each remote is updated sequentially, the serial line is used 0.36 seconds (0.072×5) of every 1-sec update cycle.

The obvious solution to increasing throughput and minimizing system cost is to increase the bit rate so that each message takes less time. Factors such as the frequency characteristics of the line and modem speeds put an upper limit on which bit rate can be used. For example, 1,200 bits per second is generally considered the upper limit on telephone lines when using frequency-shift-keying. For frequency shift keying, the terms bit rate and baud rate are synonymous and are used interchangeably.

Other factors must be considered which are not fixed limits but time dependent and "weak link" limits to the bit rate. For example, a distant remote may not be able to communicate at as high a speed as a closer remote. Historically, in party line systems, all remotes are strapped to the same bit rate. Therefore, all remotes are slowed down to be compatible with the "weak link" remote. This results in a reduced throughput and an increased system cost because of the use of the low bit rate.

Modulators/demodulators (modems) occasionally need calibration especially in temperature extremes. Many times to reduce the frequency of modem calibration, a lower bit rate is used. Other time dependent limits such as excessive elecrical noise during certain periods of the day have also caused a lower bit rate to be used. Even when a compromise bit rate is found, there are still times when a serial line to a particular remote is inoperable. Many times the inoperable serial line would operate at a lower bit rate than the compromise bit rate. However, when the remotes are widely separated or even strung across a continent, it would be extremely difficult to try to manually reset each remotes bit rate switch.

It is thus an object of this invention to provide a method for increasing throughput and minimizing cost for a serial line communications system by operating at a prime baud rate and shifting to a lower secondary baud rate only when errors or transmission problems occur when data is transmitted at the prime baud rate. In this manner, a substantially optimum bit rate is being utilized at all times and the throughput of the communications system is thus increased with a corresponding reduction in system cost.

In accordance with the present invention, a method is provided whereby a communication line controller (CLC) and a remote device controller (RDC) are utilized to interface a central computer to a remote device. A large number of RDCs may be tied to the central computer through a single CLC if desired. Each RDC is connected to at least one remote device. The CLC is interfaced directly to central computer. The CLC and RDC are connected by means of a serial communication line.

The CLC receives commands and a message from the central computer. The CLC formats the message and adds a sync pattern because the serial communication is asynchronous (no clock timing contained in the message). The message from the computer contains a command to be executed by the addressed RDC and the channel and point address of the remote device to be controlled. Sixteen bits of data, if any, will follow the channel and point address. The CLC computes a seven bit Bose'-Chauduri (BCH) detection code and appends the error detection code to the end of the message.

The formatted serial message is placed on the serial line at a primary bit rate by the CLC. The RDC is continually monitoring the serial line. When the serial line goes active, the RDC times and compares symmetry of the sync pattern. Based on the time required for the sync pattern, the RDC determines the bit rate. The message is received at the determined bit rate and the error detection code is checked. If no errors are detected and the RDC detects its own address in the message, the RDC will execute the command part of the message. Should the command require the RDC to reply to the CLC, the RDC will transmit a response to the CLC at the same bit rate and in the same format as the received message.

If the CLC expected a reply from the RDC and either didn't get a reply or the reply contained an error, the CLC will retransmit the same message at the same bit rate. If the error persists, the CLC will lower the bit rate and try once more. If communications cannot be established at the lower bit rate, the CLC will interrupt the central computer and thus notify the central computer of the transmission problem. In this manner, the primary bit rate is utilized for transmission of messages unless error occur. If errors occur in the messages, a lower secondary bit rate is utilized. In this manner, the throughput of the serial communication line is substantially optimized with a resulting reduction in cost of the serial line communication system.

Other objects and advantages of the invention will be apparent from the foregoing description and from the claims as well as from the detailed description of the drawings in which:

Figure 2:
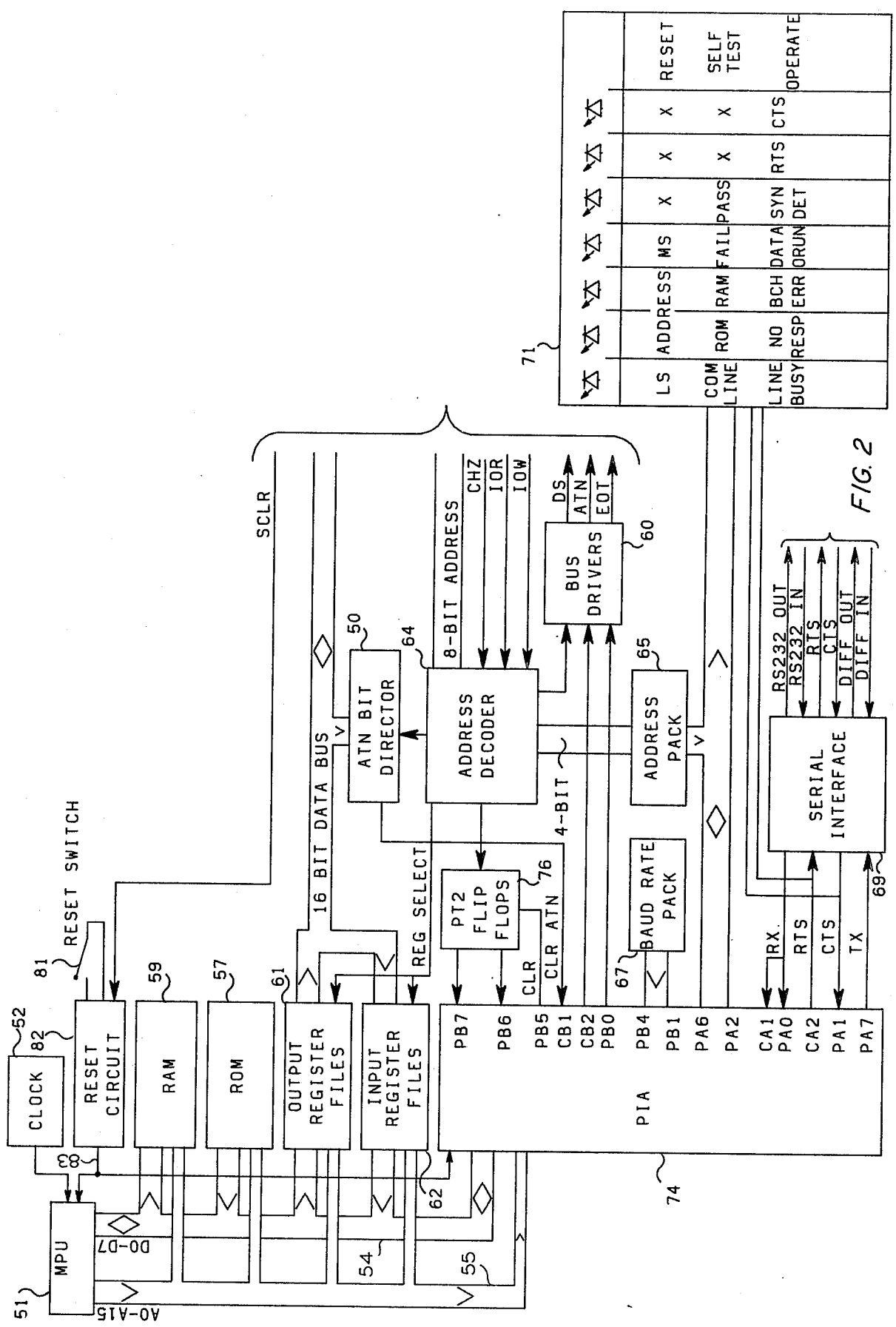
FIG. 2 is a detailed block diagram of the CLC illustrated in FIG. 1.
Figure 4:
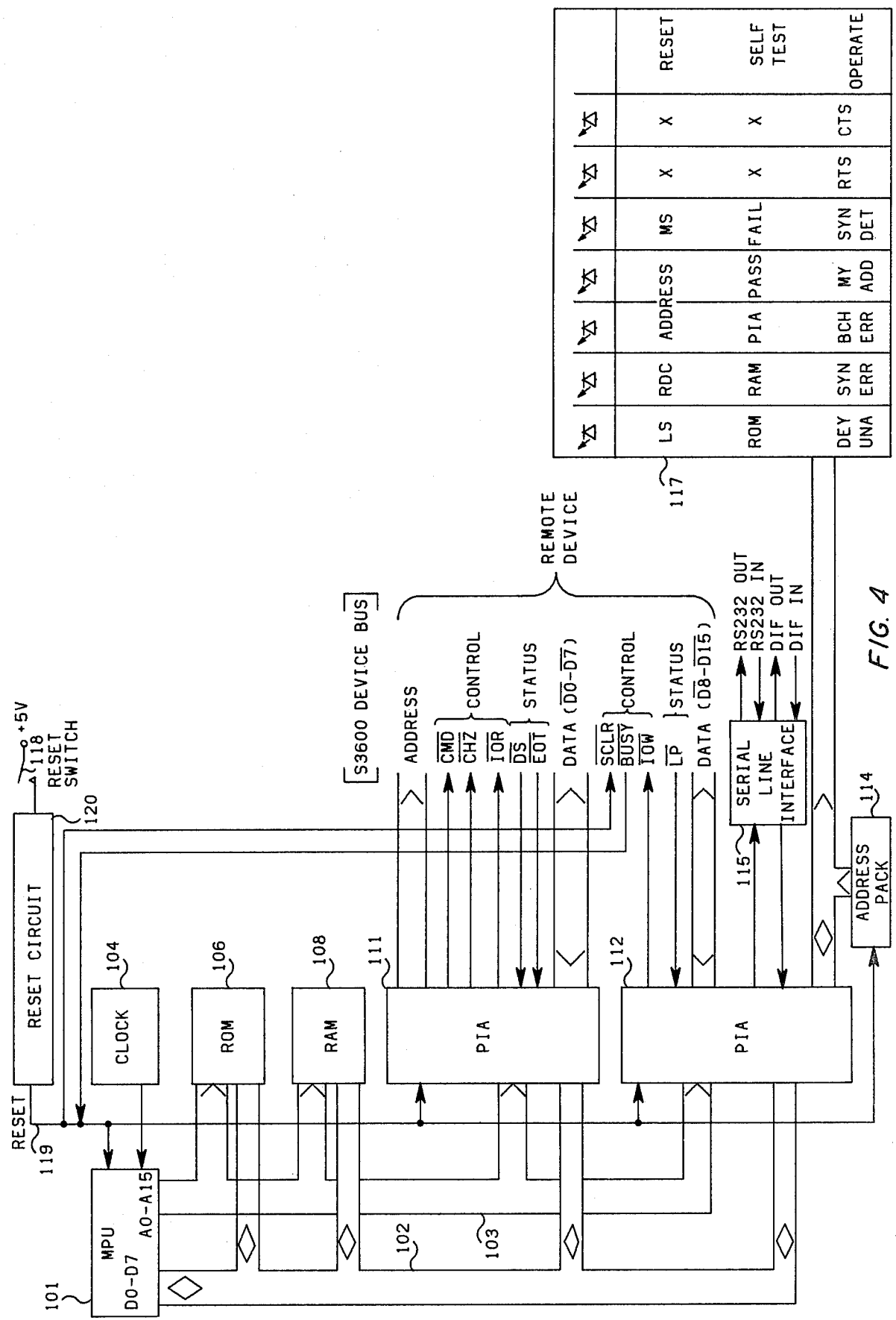
FIG. 4 is a detailed block diagram of the RDC illustrated in FIG. 1.
Figure 5A:
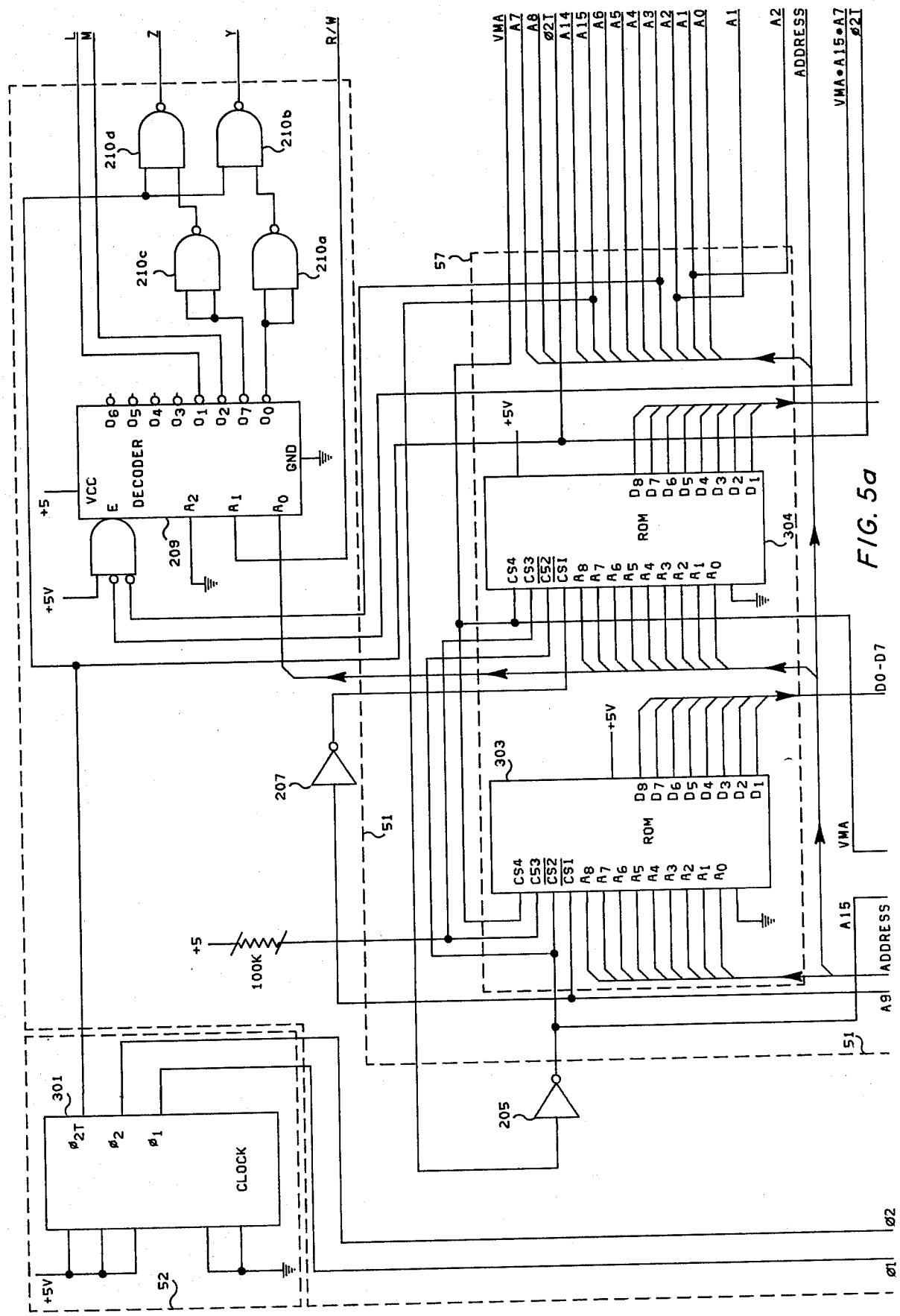
Figure 5B:
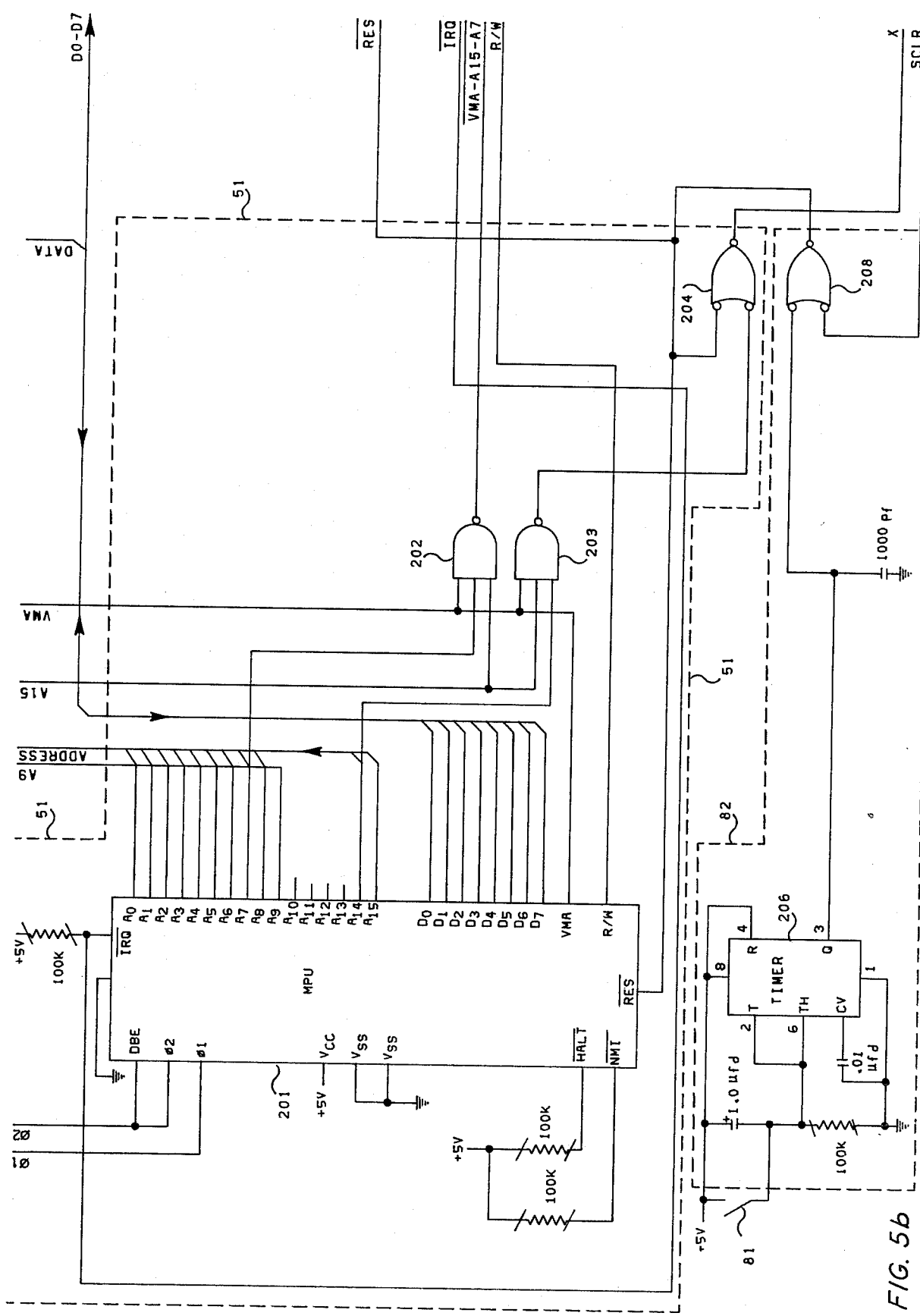
Figure 5C:
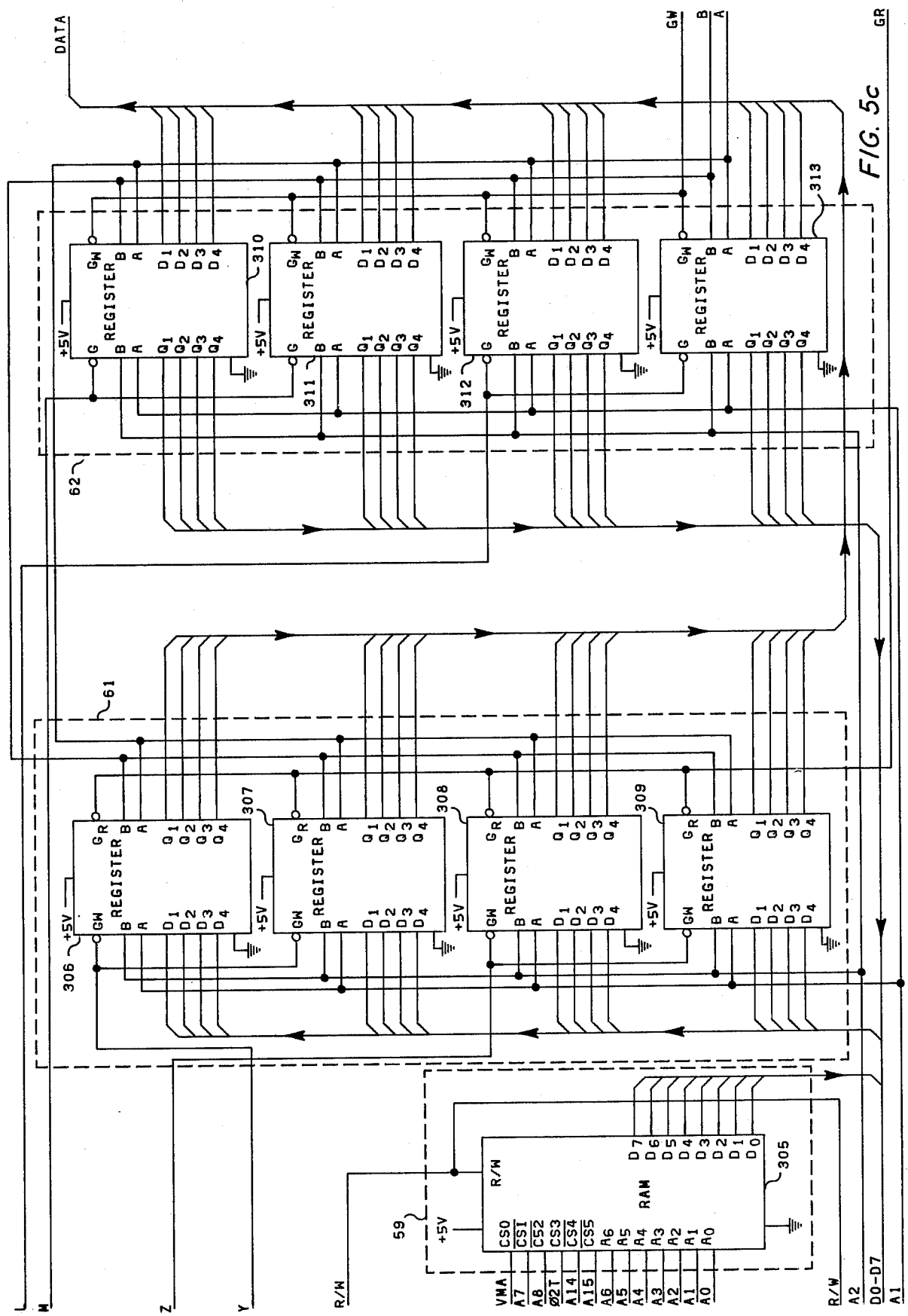
Figure 5D:
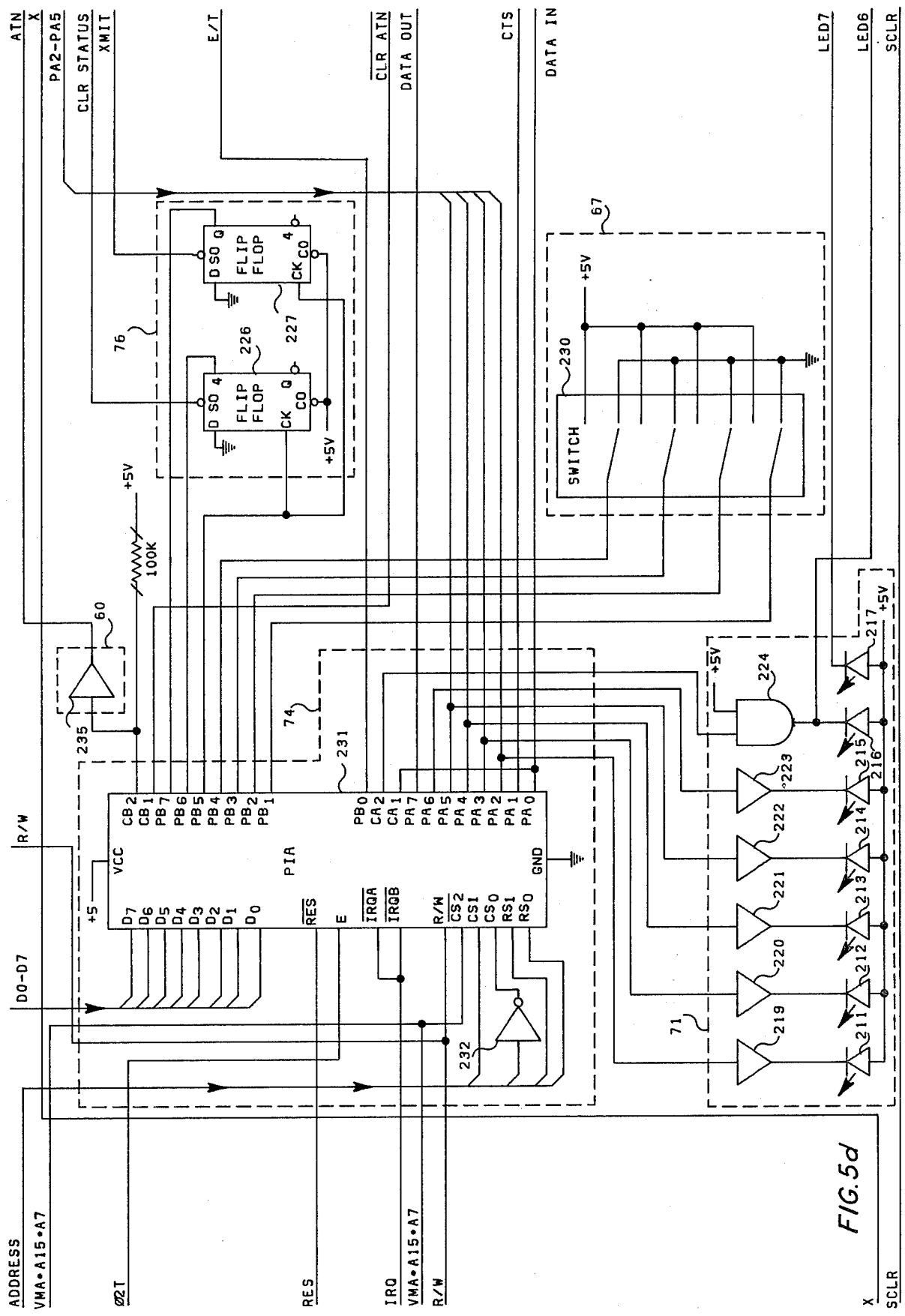
Figure 5F:
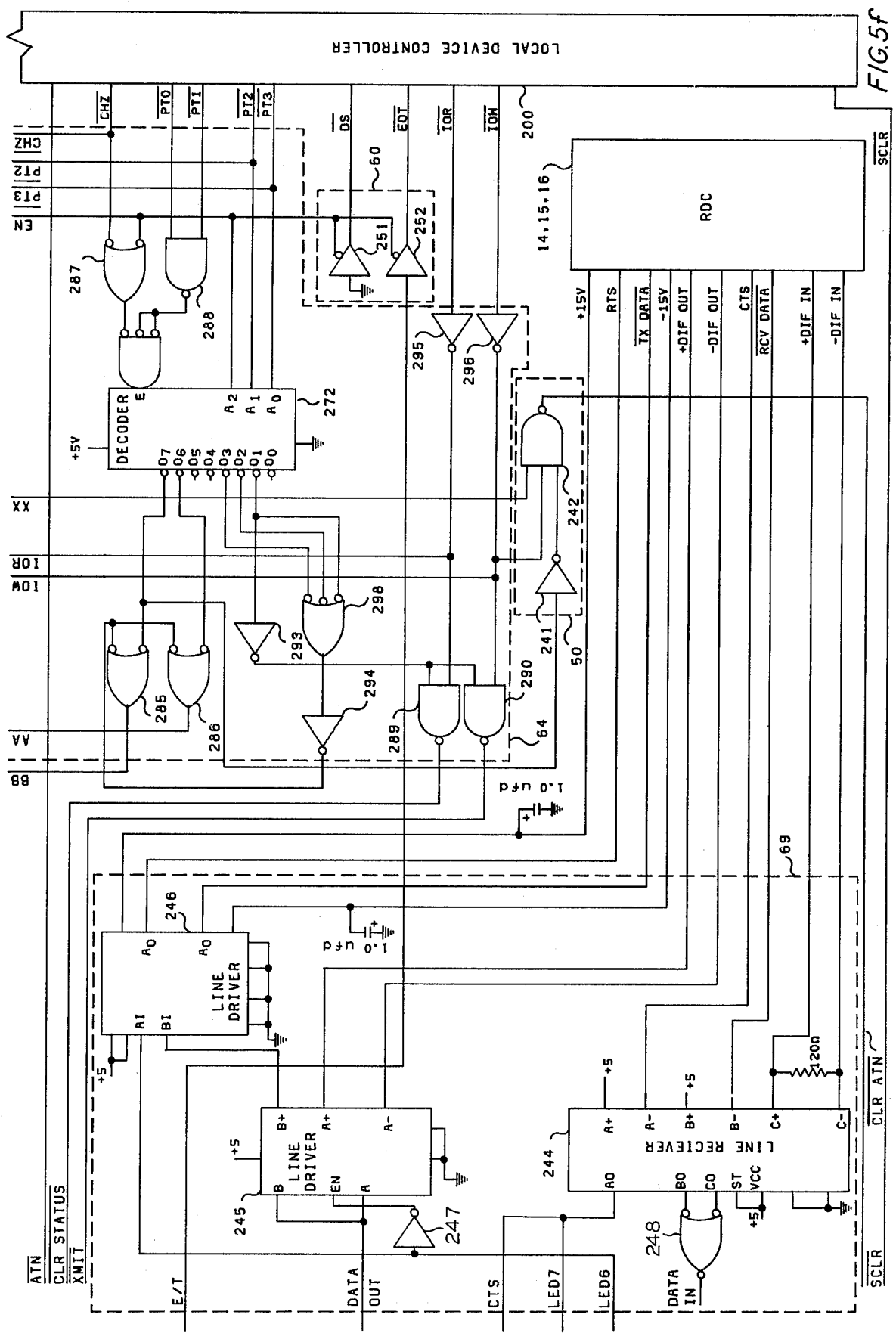
Figure 6:
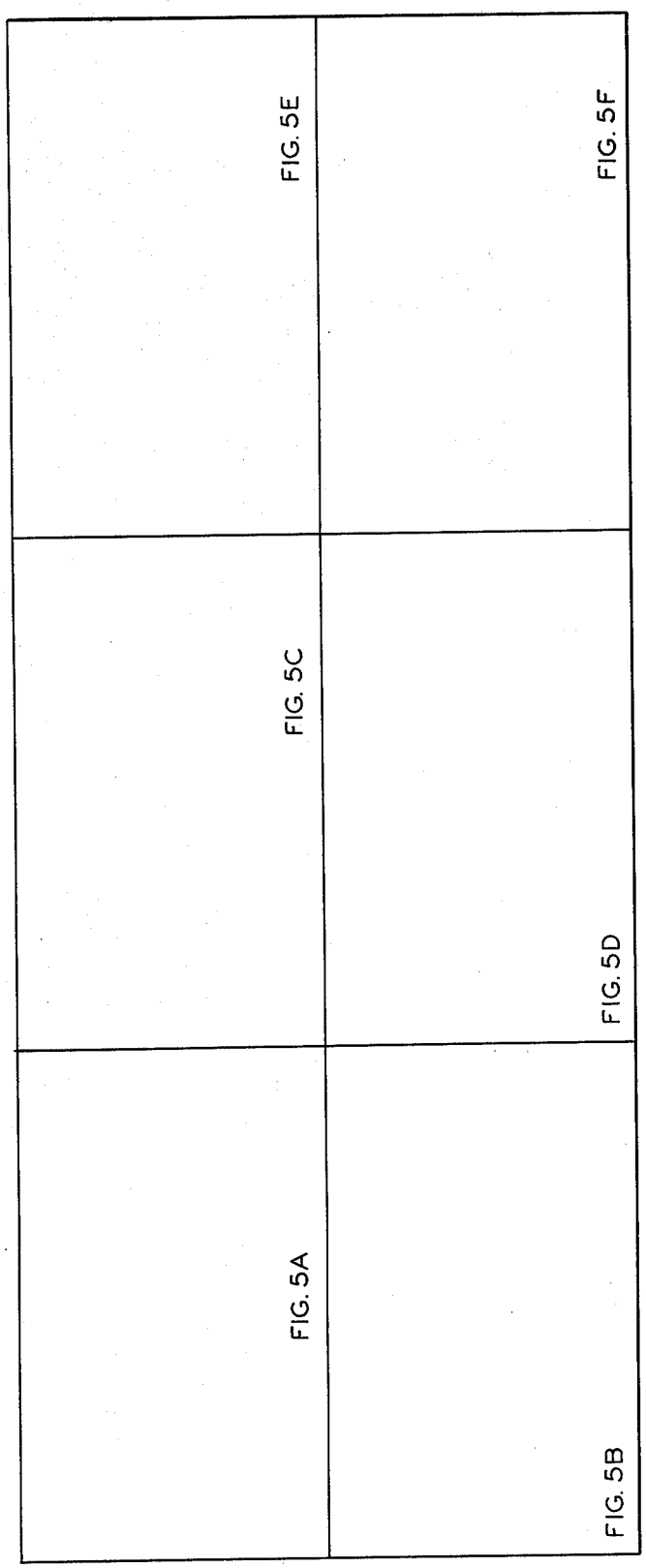
Figure 7A:
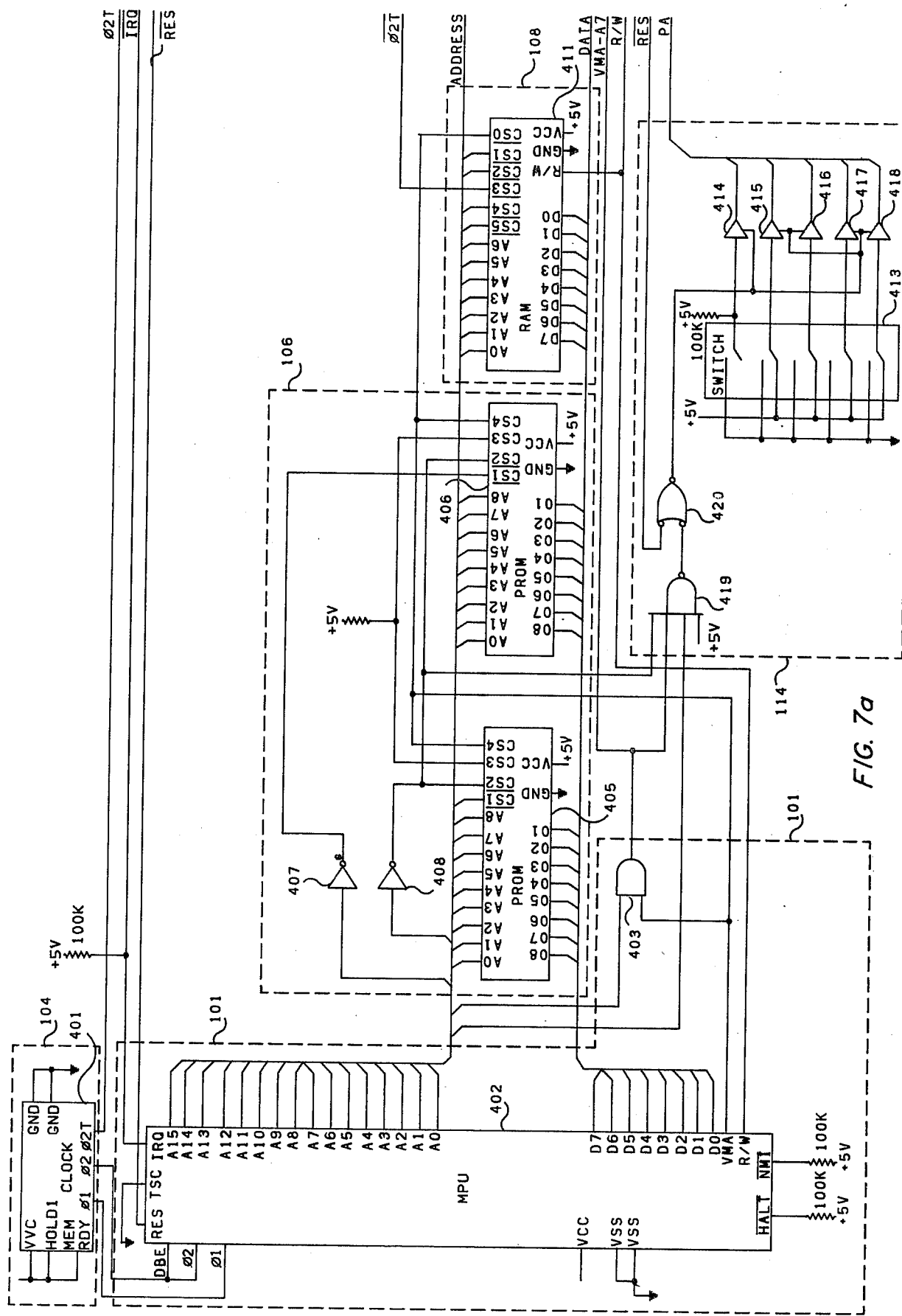
Figure 7B:
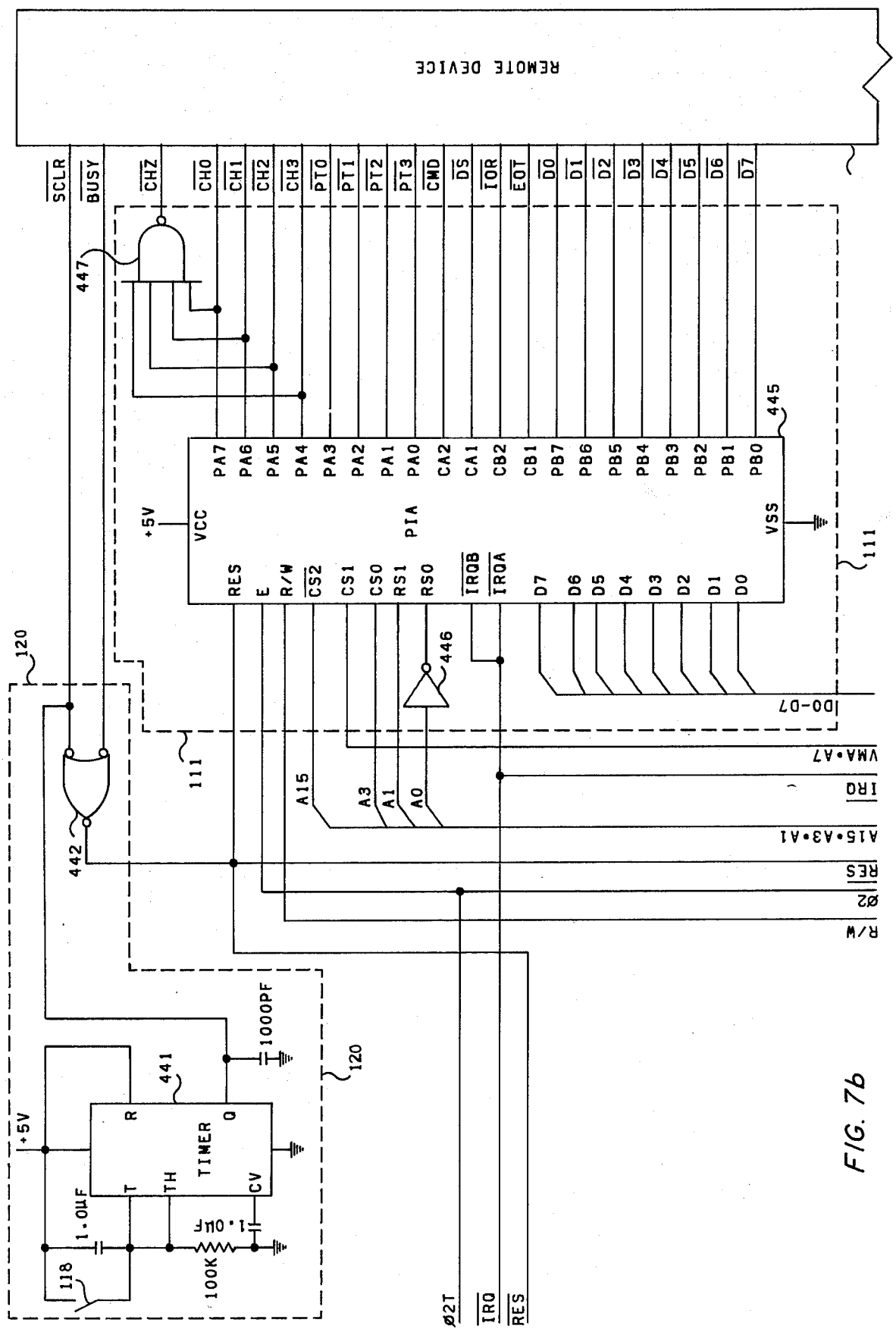
Figure 7C:
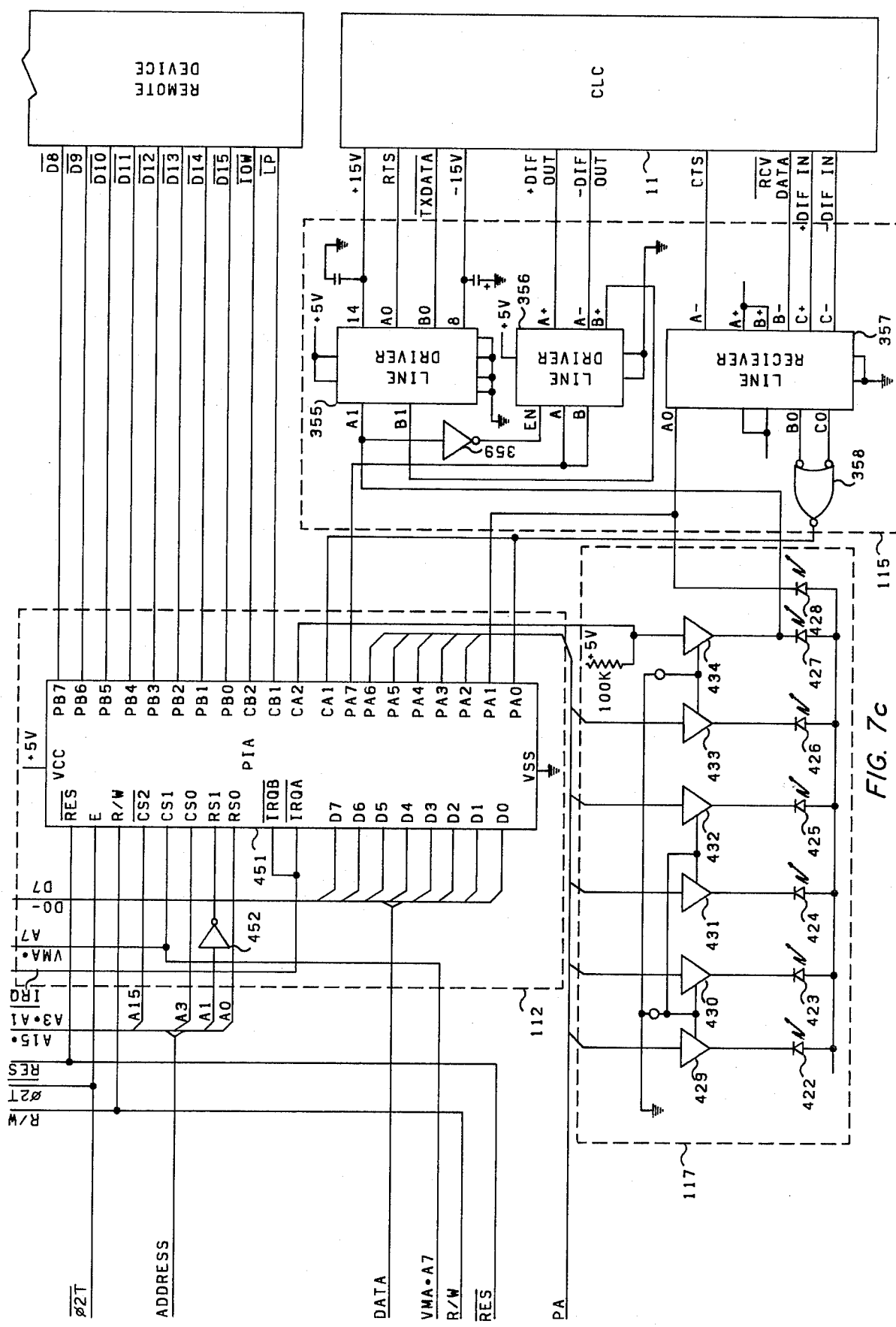

FIGS. 5a-f are a detailed schematic of the CLC illustrated in FIG. 2;

FIG. 6 is an illustration of the manner in which FIGS. 5a-f should be combined to make a complete schematic;

FIGS. 7a-c are a detailed schematic of the RDC illustrated in FIG. 4; and

FIG. 8 is an illustration of the manner in which FIGS. 7a-c should be combined to make a complete schematic.

The present invention is described in terms of the Optrol 3600 Process I/O system manufactured by Applied Automation Inc., Bartlesville, Okla. for which the present invention was designed to be incorporated. However, the invention can be utilized in any serial line communication system.

The invention is described in terms of specific electronic components and specific computer systems. However, the invention is applicable to different electronic circuit configurations which carry out the purpose of the present invention and is also applicable to different circuit components and different computer systems which are supplied by a plurality of vendors.

Figure 1:
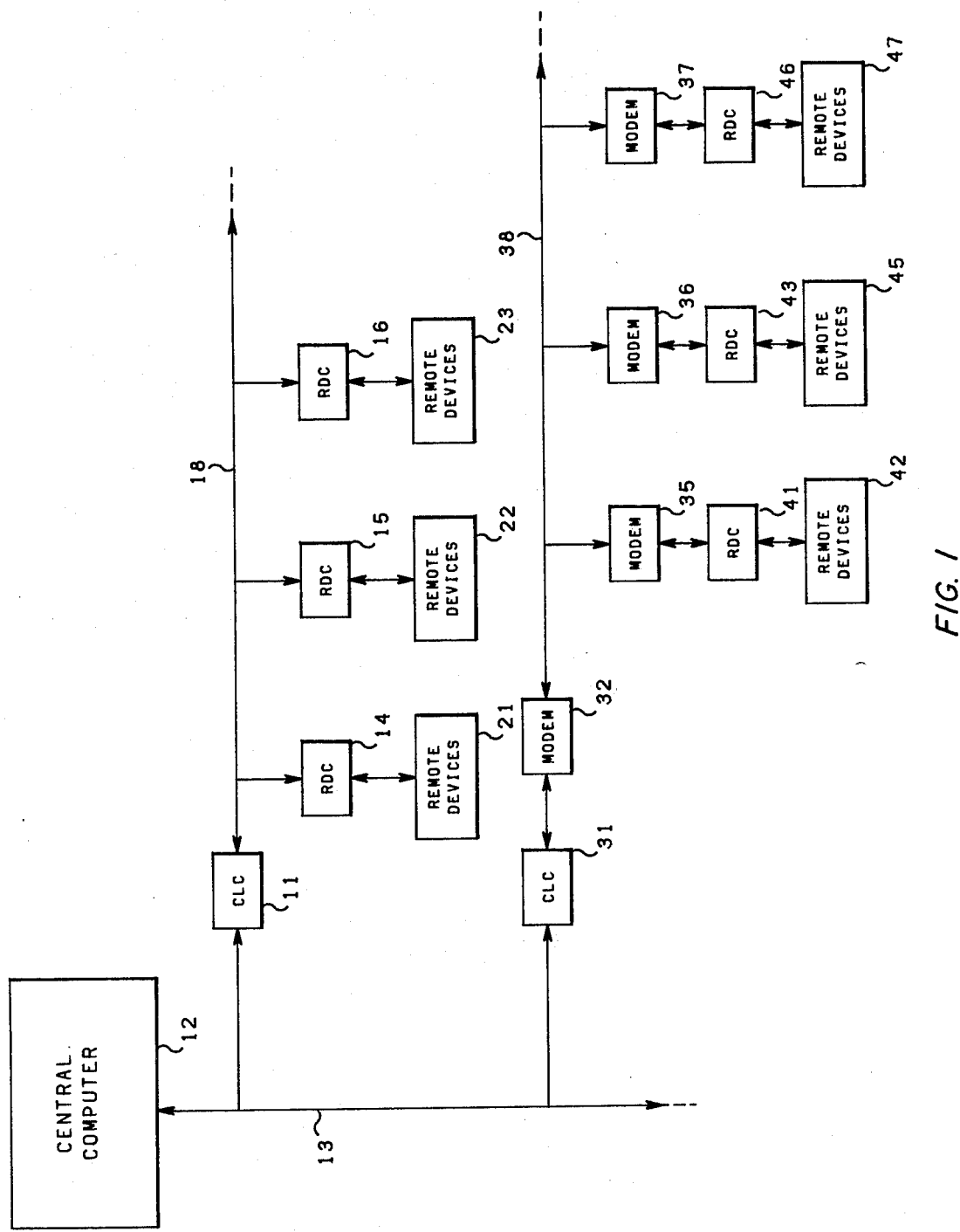
FIG. 1 is a block diagram of the serial line communication system of the present invention.

Referring now to FIG. 1, a communication system incorporated in the present invention is illustrated. The CLC 11 is interfaced to the central computer 12. The CLC 11 is connected to a plurality of RDCs 14, 15 and 16 by the serial transmission line 18. The serial transmission line 18 is preferably a twisted, shielded pair of wires. Modulators/demodulators (modems) are not required if the RDCs are located less than about ten thousand feet from the CLC 11. The RDC 14 is connected to the remote devices 21 which may be either a single remote device or a plurality of remote devices. In like manner RDC 15 is connected to the remote devices 22 and RDC 16 is connected to the remote devices 23.

The CLC 31 is connected to the central computer 12 by means of the computer bus 13. The CLC 31 is electrically connected to the modem 32. The modem 32 is connected to a plurality of modems 35, 36 and 37 by the serial communications line 38. The serial communications line 38 is preferably a telephone line which can be utilized to connect modems which are widely separated. The modem 35 is electrically connected to the RDC 41. The RDC 41 is electrically connected to the remote devices 42. In like manner, the modem 36 is connected to the RDC 43 and the RDC 43 is connected to the remote devices 45. Also the modem 37 is electrically connected to the RDC 46 and the RDC 46 is electrically connected to the remote devices 47. The modems 32, 35, 36, and 37 are preferably Optrol 3600 Modems manufactured by Applied Automation, Inc., Bartlesville, Okla.

The CLC 11 and CLC 31 are identical. RDCs 14, 15, 16, 41, 43 and 46 are also identical. The invention will be described in terms of only one CLC and one RDC. However, this description is applicable to all of the CLCs and RDCs illustrated in FIG. 1. A larger or smaller number of RDC's and CLC's, than that illustrated in FIG. 1, could be utilized in a communication system if desired.

The following is a typical operational sequence for the communication system illustrated in FIG. 1. The CLC 11 receives commands and a message from the central computer 12. The CLC 11 formats the message as will be more fully described hereinafter. After the CLC 11 processes the message from the central computer 12, the formatted message is sent by means of the serial transmission line 18 to the RDC 14.

The RDC 14 is continually monitoring the serial transmission line 18. When the serial transmission line 18 goes active, the RDC 14 times and compares symmetry of the sync pattern which was established by the CLC 11. Based on the time required for the sync pattern, the RDC 14 determines the bit rate at which the message is being transmitted by the CLC 11. The message is received by the RDC at the determined bit rate and the BCH error detection code which was generated by the CLC 11 is checked. If no errors are detected and the RDC 14 detects its own address message, the RDC 14 will execute the command part of the message from the central computer 12. This execution will usually involve reading data from the remote devices 21 or some similar operation. The data from the remote devices 21 will then be generally transferred back from the RDC 14 through the CLC 11 to the central computer 12. The data or message from the RDC 14 is transmitted at the same bit rate and in the same format as the received message.

If the CLC 11 expected a reply from the RDC 14 and either did not get a reply or the reply contained an error, the CLC 11 will retransmit the message at the same bit rate. If the error persists, the CLC 11 will lower the bit rate and try once more. Many times a serial transmission line which is inoperative at a higher primary baud rate is operative at the lower bit rate. If the shift to the lower bit rate eliminates the error, the data or message from the RDC 14 is transferred to the central computer 12 and the CLC 11 automatically shifts back to the higher primary bit rate. If the shift to the lower secondary rate does not eliminate the error, the CLC 11 interrupts the central computer 12 and thus notifies the central computer 12 that a transmission problem exists.

The central computer 12 can transmit a command or message to any RDC simply by addressing that particular RDC. Since all of the RDCs can control a plurality of remote devices, the central computer must also provide the particular address of the remote device from which data or performance is required. A single central computer system can thus gather data from a very large number of remote devices simply by cyclically addressing all of the remote devices.

The CLC 11, which is illustrated in FIG. 1, is more fully illustrated in FIG. 2. Referring now to FIG. 2, the microprocessor (MPU) 51 is preferably an MC6800 Microprocessor manufactured by Motorola Semiconductor. The microprocessor 51 performs all arithmetic, logic and control functions for the CLC 11. The microprocessor 51 is an 8-bit microprocessor which has an 8-bit bidirectional data bus 54 and a 16-bit address bus 55. The microprocessor 51 communicates with the remaining circuits of the CLC 11 via the address bus 55 and the data bus 54. Hexadecimal addressing is used.

The microprocessor clock 52 is preferably an MC6870A manufactured by Motorola Semiconductor.

The microprocessor clock 52 provides the clock signals required by the microprocessor 51.

The read-only memory 57 is made up of two 512×8 programmed read-only memories (ROM) which are preferably 93448 ROM's manufactured by Fairchild Semiconductor. The read-only memory 57 is addressed from locations FC00 to FFFF. The read-only memory 57 contains the sequential program instructions which the microprocessor 51 uses to perform its various tasks.

The random access memory (RAM) 59 consists of one 128×8 bit static semiconductor memory which is addressed from 0000 through 007F. The RAM 59 is preferably an MC6810 manufactured by Motorola Semiconductor. In addition to the assigned memory location which are addressed by the hexadecimal address 0000 through 007F, the RAM 59 contains a variable length stack starting at location 007F and extending toward location 0026. The variable length stack is used by the microprocessor 51 for temporary address and data storage. The RAM 59 is used as a scratch-pad memory by the microprocessor 51. The microprocessor 51 stores variable data in the RAM 59 such as data to be transmitted, data received and the baud rate at which the data is to be transmitted.

The output register file 61 and the input register file 62 interface the microprocessor 51 to the 16-bit data bus of the central computer 12 which is illustrated in FIG. 1. The register files are made up of a plurality of 74LS170 registers manufactured by National Semiconductor. The register files are arranged in two groups having a 4×16 bit storage area. The output register file 61 contains data which is to be presented to the data bus of the central computer 12. The input register files contain data received from the central computer 12. The output register file 61 and the input register file 62 may be written into and read from simultaneously thereby providing a high speed asynchronous interface to the central computer 12.

The output register file 61 and the input register file 62 act as a data storage buffer between the central computer 12 and the data bus 54 and the address bus 55 of the microprocessor 51. The register files store four 16-bit words. The output register file is an open collector output file which is written into by the microprocessor 51. The input register file is a 3-state output file which is read by the microprocessor 51. The inputs and outputs of the output register file 61 and the input register file 62 are isolated so that read and write operations may be performed without synchronization of the bus line from the central computer 12 and the data bus 54 and address bus 55 of the microprocessor 51. The output register files and the input register files are addressed at location 00F0-00F7.

The address decoder 64 compares the address from the central computer 12 to the address which has been preset in the address pack 65. When the central computer 12 is addressing the CLC 11, the address decoder 64 selects the proper register file and either gates the data from the central computer 12 into the input register file 62 or gates the data which is in the output register file 61 onto the data bus of the central computer 12. The address decoder 64 works independently of the mircoprocessor 51.

The baud rate pack 67 provides a means by which the primary and secondary baud rates for the CLC can be set. Options available are 9600 baud, 4800 baud, 2400 baud, 1200 baud, 600 baud, 300 baud and 150 baud. If the baud rate pack is set to a baud rate of 1200, then the secondary baud rate will be 600 baud. Obviously other baud rates could be utilized if desired but the foregoing baud rates are presently preferred.

The serial line interface 69 converts the serial line voltages to transistor-transistor logic (TTL) levels of zero volts and +5 volts and also converts the TTL levels from the peripheral interface adapter 74 to voltages acceptable to the serial line. Either the RS232 or the differential (RS422) will be used for communication. Request to send (RTS) and clear to send (CTS) are modem control signals.

The status indicators 71 are a group of light emitting diodes (LED) which display self-test information as well as operational information in visual form to the operator. The LEDs are labeled for reset, self-test and operation.

The peripheral interface adapter (PIA) 74 provides the interface between the input/output (I/O) options of the CLC 11 and the microprocessor 51. The PIA 74 is preferably a MC6820 PIA manufactured by Motorola Semiconductor. The PIA 74 is a programmable I/O device which resides at memory location 00F8, 00F9, 00FA, and 00FB. Location 00F8 is the A side peripheral I/O port (PAs). Location 00F9 is the A side control register (CAs). Location 00FA is the B side peripheral I/O port (PBs). Location 00FB is the B side control register (CBs).

Since the PIA address is not fully decoded, images of the PIA reside at multiple memory locations. One of these images, 70F8, is used in reading the address pack 65. The A side of the PIA is used primarily for serial line communication and visual status indication. The B side of the PIA is used primarily for interfacing to the central computer 12 and reading the baud rate pack 67.

The A side of the PIA 74 is used first at power on or reset to read the contents of the address pack 65. The PAs are programmed as inputs. When the microprocessor 51 reads the PA image at location 70F8, the contents of the address pack are gated onto the PA lines at D5 through D2. After the reset sequence, the serial data output (TX) is programmed as an output and clear to send (CTS) and the serial data input (RX) are programmed as inputs. The status indicators are programmed as inputs except when one of the LED's is to be lit.

The A side control register (CAs) has D7 dedicated to the serial data input (RX). This is the same RX signal found on D0 of the PAs. The difference is that the CA input is edge sensitive while the PA input is level sensitive. The direction of the CA edge sensitivity is controlled by CA bits D1 and D0. When detecting a sync pattern, this edge sensitivity is programmed to detect the edges of the sync bits. After detecting the sync pattern, the serial data is sampled at the center of each bit cell at the RX input on the PAs. The CA bit D6 is programmed as an output via the request to send (RTS) control register bits D5 through D3. The RTS output is also programmed to be a high or low level through the RTS control register bits.

The B side of the PIA 74 is used to interface some of the central computer 12 control signals to the microprocessor 51. The B side of the PIA is also used to interface the baud rate pack 67 to the microprocessor 51. After each completed transmit/receive sequence, the microprocessor 51 reads the baud rate pack 67 at location 00FA bits D4 through D1. This provides a resetting of the proper baud rate in case the microprocessor 51 has shifted baud rates in a retry attempt.

The PBs associated with the baud rate pack are always used as inputs.

The address decoding circuitry 64 will set flip-flop 76 when an input/output write (IOW)) or an input/output read (IOR) occurs. The transmit input on D7 of the PBs notifies the microprocessor 51 that the central computer 12 has loaded all necessary data into the input register file 62 and transmission to the RDC should begin. This input also causes the microprocessor 51 to clear the status register of the PIA 74. The point 2 (PT2) IOR input of the PBs is used to notify the microprocessor 51 that the central computer 12 has read the data in the output register file 61. It is this bit which the microprocessor 51 interrogates prior to setting the data overrun error in the status registers of the PIA 74. The PT2 IOR bit also causes the MPU to clear the status register after the central computer 12 has read the data from the output register file 61. Once the flip-flop 76 has been set by the address decoding circuitry 64, the microprocessor 51 clears the flip-flop 76 by pulsing the clear output on D5 of the PBs.

The D0 output of the PBs is used to enable the end of transmission (EOT) output when the CLC 11 is addressed. When the CLC 11 is busy, the D0 output of the PBs is set to a "1".

The B side control register is used for the attention (ATN) interrupt interface to the central computer 12. D6 of the CBs is programmed as an output which, after being set low, will return to high when the ATN CLR bit is set. Bit D7 of the PBs is programmed to respond to a falling edge on the ATN CLR line. When the central computer 12 writes to channel 00, the address decoding hardware creates an ATN CLR pulse if the central computer 12 is trying to clear the ATN line. This pulse clears the ATN line and causes an interrupt to the microprocessor 51.

A typical operational sequence for the CLC illustrated in FIG. 2 is as follows. When the reset switch 81, which is associated with the reset circuit 82, is depressed or the system clear (SCLR) line is activated, the reset line 83 drops to a low level (0 volts). This low level resets and clears the peripheral interface adapter 74 and gates the address selected by the addresss pack 65 onto the status indicator 71 to allow the operator to verify proper addressing. The address will appear in binary form on the LEDs marked LS, address and MS on the reset line. The address will be displayed as long as the reset line 83 is held low.

When the reset switch is released or the system clear line is deactivated, the reset line 83 returns to high allowing the microprocessor 51 to retrieve the restart interrupt vector from the read-only memory 57. The microprocessor 51 then executes the reset initialization program for the CLC illustrated in FIG. 2. This same reset initialization sequence is performed when power is applied to the CLC.

At the beginning of the reset initialization, the microprocessor 51 programs the status indicator bits of the PIA 74 as low outputs. This turns on all of the LEDs located on the status indicator 71 to verify that all of the LEDs light.

The microprocessor 51 then executes a self-test program which tests the read-only memory 57, the random access memory 59, the peripheral interface adapter 74 and the serial communication line. The results of the test are displayed at the status indicator 71.

The random access memory locations 0000 through 007F are tested by writing an incrementing data pattern in each location and then reading that location to verify the contents. On the first pass, the contents of each RAM location contains its address. On the second pass, the contents of each RAM location contains its address plus one. This process is continued until 128 passes have been made. Should the contents of a RAM location not correspond to what was written into it, the test fails and the LEDs labeled "RAM" and "FAIL" on the self-test line will be lit.

The PIA 74, the serial communication line interface 69 and the serial communication line are tested together. This test requires that the serial communication line have at least one operational RDC on it. The microprocessor 51 reads the baud rate pack 67 and determines the serial communication line baud rate. Starting with RDC address 1, the CLC transmits a test pattern to the RDC. If no response is received, the CLC will try the next RDC address until all of the RDCs have been tried. If any addressed RDC responds, the test passes. If no RDC responds, the test fails and the LEDs labeled "COM LINE" and "FAIL" will be lit on the status indicator 71. The test will fail on any of the following conditions:

(1) No clear to send (CTS) is received on the serial communication line; (2) No operational RDC is attached to the serial communication line;

(3) A communication line failure such as an inoperable serial communication line or an inoperable modem;

(4) The wrong baud rate back has been set up;

(5) A defective peripheral interface adapter 74; or (6) A defective chip in the serial interface 69.

When all of the preceding tests have passed, the microprocessor 51 will turn off all of the LEDs on the status indicator 71 except the LED labeled "PASS" on the self-test line. The PASS LED will stay lit for about 4 seconds indicating that the CLC has passed the self-test portion of the reset initialization.

After a successful self-test, the microprocessor 51 will read the contents of the address pack 65. This number, which is the address of the CLC, is stored in the random access memory 59 for future reference and will not be changed unless a reset sequence is initiated. The CLC will then enter a waiting state in which the CLC waits for a command from the central computer 12 which tells the CLC that data has been loaded into the input register file 62 for transmission to an RDC. The central computer 12 initiates the activity of the CLC by checking the status of the CLC. If the CLC is not busy, the central computer 12 writes the data to be transmitted, if any, into the input register file 62 of the CLC. The central computer 12 then writes the operational code, the RDC address, and the remote device address into the input register file 62 of the CLC.

Upon receipt of a transmitted command, the microprocessor 51 sets the request-to-send (RTS) signal, clears the end-of-task (EOT) signal and sets a line-busy bit in the status register of the PIA 74. While waiting for the clear-to-send signal from the serial communication line, the microprocessor 51 transfers the data to be transmitted from the input register file 62 to the random access memory 59. If the clear-to-send signal has not been been returned within 100 milliseconds, the microprocessor 51 will set the no clear-to-send bit in the status register of the peripheral interface adapter 74 and if enabled will interrupt the central computer 12 and wait for a new instruction.

If the clear-to-send has been received, the microprocessor 51 will transmit the message in the format shown in Table I.

TABLE I

| Bits | Definition |
|---|---|
| 0–3 | 4-bit sync pattern |
| 4–6 | 3-bit operational code |
| 7–11 | 5-bit RDC address |
| 12–15 | 4-bit remote device channel address |
| 16–19 | 4-bit remote device point address |
| 20–35 | 16-bit data field |
| 36–43 | 7-bit BCH character plus one stop bit |

The first four bits consist of a 4-bit sync pattern. The sync pattern consists of three level changes in the serial line. The first level change is from the inactive mark condition to the space condition. This space condition is maintained for 1.5 bit times. The line then transmits to a mark condition for 1.5 bit times and then returns to a space condition for 1.0 bit times.

Following the sync pattern is a 3-bit operational code (Opcode). The operational code and data formats are set forth in Table II where C/A is representative of command/address.

TABLE II

OPCODES AND DATA FORMATS

| Op-codes | Function | Data RCVD | Data XMTD | Bus Control |
|---|---|---|---|---|
| 0 | Write/No Echo | C/A and data | None | IOW |
| 1 | Write/Echo | C/A and data | C/A only | IOW |
| 2 | Write/Read | C/A and data | C/A and data | IOW/IOR |
| 3 | Test | C/A and data | C/A and data | — |
| 4 | Read | C/A only | C/A and data | IOR |
| 5 | Stream | C/A only | C/A and data | IOR |
| 6 | Block | C/A only | C/A and data | IOR |
| 7 | Not assigned | — | — | — |

The functions set forth in Table II are further defined as follows:

Op Code 0-Write/No Echo—The RDC selects the remote device and writes data to it. Since no transmission is required to the CLC, the RDC goes to Wait for Sync.

Op Code 1-Write/Echo—The RDC selects the remote device and writes data to it. The RDC then transmits the C/A portion of the message to the CLC and goes to Wait for Sync.

Op Code 2-Write/Read—The RDC selects the remote device and writes data to it. The RDC then reads the device, transmits the C/A and data portions to the CLC and goes to Wait for Sync.

Op Code 3-Test—The RDC transmits the received data back to the CLC with no output to the Remote Device Bus. The RDC then goes to Wait for Sync.

Op Code 4-Read—The RDC selects the device and reads its data. The RDC then transmits the C/A and data portions to the CLC and goes to Wait for Sync.

Op Code 5-Stream—The Stream Op Code requires the RDC to read data from each available point between the channels designated in the channel address and point address fields of the received message. The channel address is the starting channel and the point address is the ending channel. For example; channel address=3, point address 9 is received with op code 5. The RDC starts reading at Channel 3 Point 0 and finishes with Channel 9 Point F.

The RDC successively selects each device point reads its data and transmits the C/A and data portion to the CLC. After the last point is selected and read, the RDC sets the end of data (EOD) bit, transmits the C/A and data and goes to Wait for Sync.

Op Code 6-Block—The block op code requires the RDC to read the addressed channel and point 255 times or until the device indicates it has no more data by setting the Last Point (LP) line of the Device Bus. The RDC selects the device. It then reads the device data and transmits that data to the CLC. The read and transmit sequence is repeated 255 times or until the device sets LP, whichever comes first. The last transmission will contain an EOD status bit. The RDC then goes to Wait for Sync.

Op Code 7-Unassigned—The RDC will take no action except to go to Wait for Sync.

The operational code is followed by a 5-bit RDC address, a 4-bit channel and a 4-bit point address of the remote device, a 16-bit data field and a 7-bit BCH field followed by a 1-bit stop code.

Figure 3:
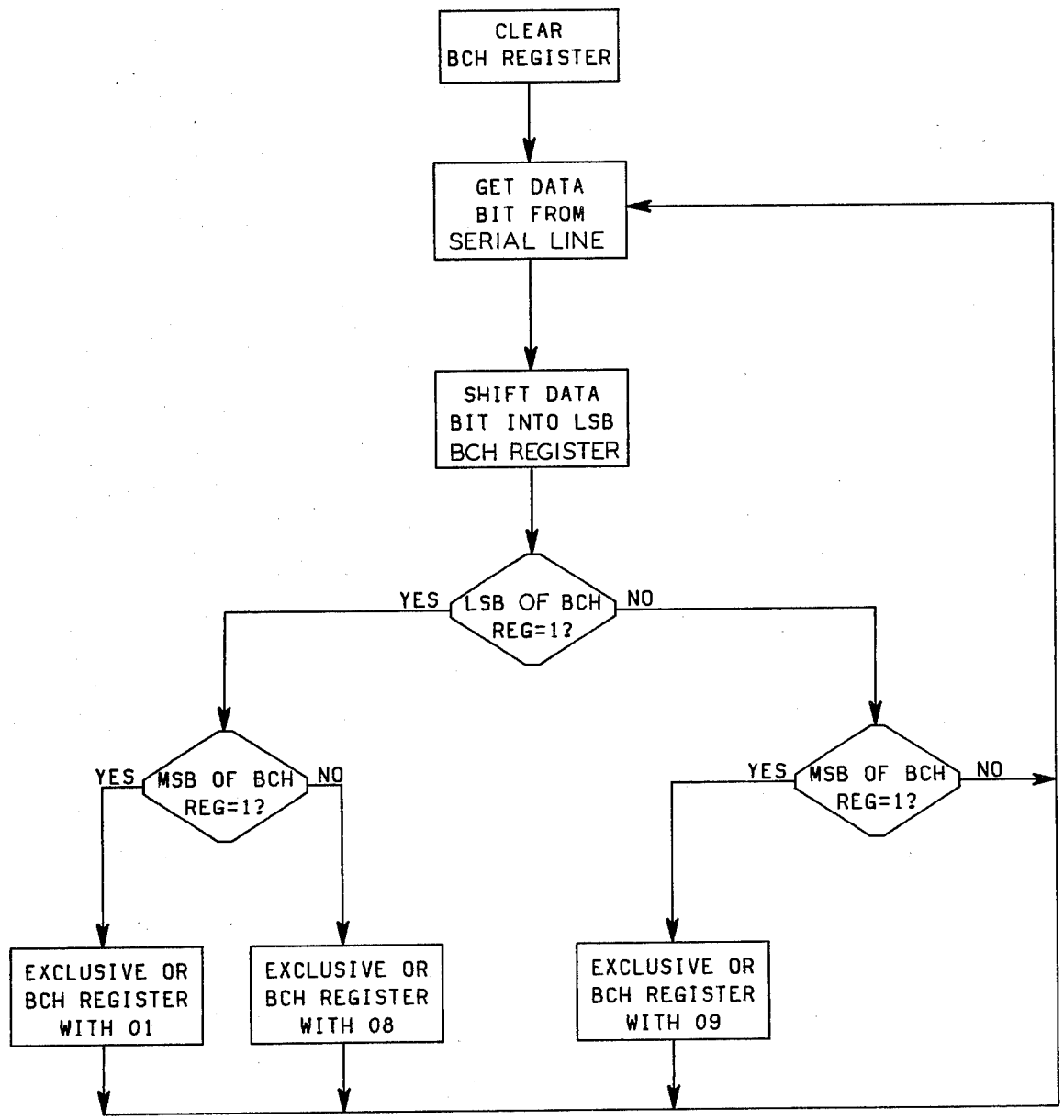
FIG. 3 is a logic flow diagram for the generation of the BCH error detection code.

As the microprocessor 51 shifts each message bit onto the serial line, it computes the BCH error detection code. The BCH polynomial is $X^7 + X^3 + 1$. FIG. 3 illustrates a computer flow diagram for the generation of the BCH error detection code.

Referring to FIG. 3, the program is initialized by clearing the BCH register such that all of the bits in the register are zero. The BCH register may be considered as an 8-bit shift register. A data bit is then obtained and is shifted into the least significant bit of the BCH register. Assuming that the data bit was a 1, the program will branch in the YES direction and will then ask if the most significant of the bit of the BCH register is equal to 1. The most significant bit of the BCH register will be equal to zero and thus the contents of the BCH register will be exclusive with a ORed hexadecimal 08. The output is essentially 00001001. A second data bit is then obtained and shifted into the least significant bit of the BCH register. Assuming that this time the data bit is zero, the program will branch in the NO direction and will again ascertain whether the most significant bit of the BCH register is equal to 1. Since the most significant bit is still equal to zero, the program will return to the get data bit from the serial line block with the status of the BCH register being 00010010. This process is continued until the most significant of the BCH register is equal to 1 at which time the contents of the BCH register can be exclusive ORed with a hexadecimal 01 or a hexadecimal 09 depending upon whether the data bit is a zero or 1. This process is continued until the entire BCH polynomial has been generated for use as an error detection code.

When the transmission is complete, the microprocessor 51 sets the transmission complete bit in the status register of the peripheral interface adapter 74. If no response from the RDC is expected, the microprocessor 51 will clear the "line busy" status bit of the periphery interface adapter 74 and return to a waiting status until a new instruction is received from the central computer 12.

If a response from the RDC is expected, the CLC will wait 100 milliseconds for the RDC to respond. If no response is received, the CLC will retransmit the message and wait 100 milliseconds for a response. If again no response is received, the CLC will drop the baud rate to the next lower baud rate and retransmit. If no response is received at the lower baud rate, the microprocessor 51 will reset the baud rate to the baud rate pack 67 setting, set the no response bit on the status register of the peripheral interface adapter 74 and if enabled will interrupt the central computer 12. The microprocessor 51 then enters a waiting state until a new instruction is received from the central computer 12.

If the RDC responds, the CLC will check the sync pattern, receive the message and check the appended BCH code. If the BCH is in error, the CLC will retry as in the no response condition. If the error persists, the BCH error bit will be set in the status register of the PIA and if enabled, the microprocessor 51 will again interrupt the central computer 12. The CLC would then return to a waiting state to await new instructions from the central computer 12.

If the received message from the RDC had no errors, the CLC will store the received message in the output register file 61, will set the received complete bit in the status registers of the peripheral interface adapter 74 and in the output register files and, if enabled, will interrupt the central computer 12. The central computer 12 reads the status of the output register files and reads the received message in the output register files. The microprocessor 51 also lights LEDs for request-to-send (RTS), clear-to-send (CTS), line busy, no response error (NO RES), BCH error (BCH ERR), data over-run error (DATA ORUN), and sync detection (SYN DET).

The RDCs 14, 15, 16, 41, 43 and 46, which are illustrated in FIG. 1, are more fully illustrated in FIG. 4. Referring now to FIG. 4, the microprocessor 101, which is preferably a MC-6800 microprocessor manufactured by Motorola Semiconductor, performs all the arithmetic, logic and control functions for the RDC. The microprocessor 101 has an 8 bit bidirectional data bus 102 and a 16 bit address bus 103. The microprocessor 101 communicates with the other parts of the RDC by means of the data bus 102 and the address bus 103. The microprocessor 101 detects serial line activity, determines the baud rate, checks for the proper sync pattern, receives the data, computes and checks the BCH code, checks for the proper remote unit address, and determines the RDC response by coding the operational code. If the operational code requires it, the microprocessor 101 transmits data back to the CLC and then waits for another sync code.

The microprocessor clock 104, which is preferably an M6870A manufactured by Motorola Semiconductor, supplies the clock signals required by the microprocessor 101.

The read-only (ROM) memory 106 contains the sequential program instructions which the microprocessor 101 uses to perform its various tasks. The read-only memory 106 is made up of two 512×8 program read-only memories which are preferably Model 93448 manufactured by Fairchild Semiconductor. The read-only memory 106 is addressed from location FC00 to FFFF.

The random access memory (RAM) 108 is used as a scratch pad memory by the microprocessor 101. The microprocessor 101 stores variable data in the random access memory such as received serial data, transmit data and the baud rate. The random access memory 108 consists of one 128×8 bit static semiconductor memory which is preferably an MC6810 manufactured by Motorola Semiconductor. The random access memory 108 is addressed from locations 0000 through 007F. In addition to the assigned memory locations located at 0000 through 007F, the random access memory 108 also contains a variable length stack starting at location 007F and extending toward location 0020. The variable length stack is used by the microprocessor 101 for temporary address data storage.

Two peripheral interface adaptors 111 and 112 are used to interface the remote device and the serial line to the RDC. The peripheral interface adapters 111 and 112 are preferably MC6820 manufactured by Motorola Semiconductor. The peripheral interface adapters 111 and 112 handle all input/output operations of the RDC. The peripheral interface adapters are treated as memory location 00F4 through 00FB. All microprocessor operations on the PIAs are addressed to these locations with the exception of reading the address pack 114 which contains the unit address of the RDC. The address pack 114 is read at the PIA image address of 70FA during initialization of the system. The PIA 111 is addressed at locations 00F4–00F7. The PIA 112 is addressed at locations 00F8–00FB.

The received (RX) data is found on both bit position 0 of 00FA and bit position 7 of 00FB. This allows the microprocessor 101 to scan the receive data line via 00FA or be interrupted by the falling edge of the receive data from location 00FB.

The initialization routines for the peripheral interface adapters 111 and 112 is as follows:

A. Location 00F4 is programmed to detect a falling edge on D select ($\overline{DS}$), and command ($\overline{CMD}$) is programmed as a high output.

B. Location 00F5 is programmed as outputs. These outputs are high except during device selection.

C. Location 00F6 is programmed to detect a falling edge on $\overline{EOT}$, and $\overline{IOR}$ is programmed as a high output.

D. Location 00F7 and 00F8 are programmed as inputs or outputs at the time they are needed for data transfer on the device bus.

E. Location 00F9 is programmed to detect a falling edge on ($\overline{LP}$), and $\overline{IOW}$ is programmed as a high output.

F. Location 00FA is read at its image location 70FA to get the remote unit address. Except when being used as an output all bit positions are programmed as inputs.

G. Location 00FB is programmed to detect a falling edge on Received data, and RTS is programmed as a normally high output.

The serial line interface 115 provides a means for interfacing the serial line to the RDC. The serial line interface 115 converts the serial line voltage levels to TTL (0 volts and +5 volts) levels and also converts the TTL levels from the RDC into the voltage levels required by the serial line.

The status indicators 117 are a group of light emitting diodes which display self-test information as well as operational information. By depressing the reset switch 118, the light emitting diodes labeled LS, ADDRESS and MS on the reset line will display the RDC unit address. Upon releasing the reset switch 118, all of the LEDs associated with the status indicators 117 should light verifying that LEDs are operational.

During the time that all LEDs are lit, the RDC is executing a self-test. If a failure occurs during the test, the RDC will light the fail LED and the diagnostic LED on the self-test line. Tests are made on the read-only memory 106, the random access memory 108, the peripheral interface adapters 111 and 112 and the serial communication line. If no failures occur, the LED labeled "pass" will light and will stay lit for approximately 4 seconds. At that time, the RDC will enter into the operate mode and establish a baud rate after the serial line has been inactive for at least one second.

An operational sequence for the RDC illustrated in FIG. 4 is as follows. When the reset switch 118 is depressed, the reset line 119 drops to a low level (0 volts). This low level produces a "system clear" (SCLR) signal on the bus to the remote device which resets all attached remote devices. The reset signal 119 also gates the address selected by the address pack 114 onto the status indicators 117 to allow the operator to verify proper addressing. The address will appear in binary form on the LEDs marked ROM, RAM, PIA, PASS and FAIL. The LEDs marked FAIL and ROM are the most and least significant bits of the address, respectively. A low level on the reset line also causes the peripheral interface adapters 111 and 112 to be reset with all lines programmed as inputs.

When the reset switch 118 is released, the microprocessor 101 retrieves the reset interrupt vector from the read-only memory 106 and proceeds to execute the reset initialization program. This same reset initialization sequence is performed when power is applied to the RDC. At the beginning of the reset initialization program, the microprocessor 101 programs the status indicator bits of the peripheral interface adapter 112 as low outputs. This turns all of the LEDs on the status indicators 117 on so that the operator can verify that all of the LEDs do light.

After the test of the LEDs associated with the status indicator 117 is completed, the microprocessor 101 executes a self-test program which tests the read-only memory 106, the random access memory 108, the peripheral interface adapters 111 and 112 and the device bus which connects the remote device to the RDC. The two 512×8 read-only memory chips which are associated with the read-only memory 106 are tested separately. The contents of each location in the read-only memory is added together to produce a sum which is compared to an established check sum. If the sum and the check sum are the same, the test passes. If not, the LEDs labeled ROM and FAIL on the self-test line of the status indicator 117 will be lit if the error in the read-only memory at address FE00–FFFF. The LEDs labeled ROM, FAIL and CTS will be lit if the error was in the read-only memory 106 at addresses FC00–FDFF.

Location 0000–007F of the random access memory 108 are tested by writing an incrementing data pattern in each location. Each memory location is then read to verify the contents. On the first pass, the contents of each random access memory location will contain its address. On the second pass, the contents of each random access memory location will contain its address plus one. This process is continued until 128 passes have been made. Should the contents of a RAM location not correspond to what was written into it, the test fails and the LEDs labeled RAM and FAIL on the status indicator 117 will be lit.

The PIAs 111 and 112 and the device bus which interfaces the remote device to the RDC are tested together. This test selectively programs the PIA bits as inputs and outputs checking for individuality and programmability. If the test fails, the microprocessor will light the LEDs labeled PIA and FAIL on the status indicator 117.

When all of the preceding tests have been passed, the microprocessor will turn off all of the LEDs except the LED labeled PASS on the status indicator 117. The PASS LED will stay lit for approximately 4 seconds.

After a successful self-test, the microprocessor 101 will read the contents of the address pack 114. This number is stored in the random access memory 108 as "my address" and is not changed unless a reset sequence is initiated. The peripheral interface adapters 111 and 112 are initialized for future device bus operations and for serial line communication.

The microprocessor 101 acquires a serial line baud rate automatically by timing the sync bits at the beginning of a message or using a previously established baud rate. To prevent erroneous reception after reset, the RDC waits for the serial line to be inactive, in mark condition for approximately 100 milliseconds. If the serial line has been inactive for approximately 100 milliseconds after a reset or 10 milliseconds after the last activity, the RDC will compute a new baud rate. The RDC will wait in this state scanning the serial line for a space condition to occur.

All communication on the serial line is initiated by the CLC. A message having the format previously described in conjunction with the description of the CLC is received by the RDC. In order to establish the baud rate of the serial message, the RDC times the duration of the sync bits which precede the message from the CLC. When the serial line transits from the inactive mark condition to the space condition of the first pulse of the sync bits, the microprocessor starts counting the number of microseconds to the next mark condition. This elapse time is used to determine the probable baud rate as set forth in Table III.

TABLE III

| AUTOMATIC BAUD RATE DETERMINATION | |
|---|---|
| Bit Time ($\mu$ sec) | Baud Rate |
| 104 | 9600 |
| 208 | 4800 |
| 416 | 2400 |
| 556 | 1800 |
| 832 | 1200 |
| 1666 | 600 |
| 3333 | 300 |
| 5000 | 200 |
| 6667 | 150 |
| 7435 | 134.5 |
| 9091 | 110 |
| 13333 | 75 |
| 20000 | 50 |

The microprocessor 101 stores the probable baud rate as the established baud rate and lights the sync detect (SYNDET) LED on the status indicator 117. The established baud rate may be used in future communications with the CLC. If a sync pattern was not valid, the microprocessor lights the sync error (SYNERR) LED on the status indicator 17 and goes to a waiting condition.

Having determined the baud rate, the microprocessor 101 samples the serial line in the center of each bit cell. As each bit is sampled, it is shifted into a location in the random access memory 108 to form a parallel word. Each bit is also used to update the BCH check code. The BCH check code is generated in the same manner as illustrated in FIG. 3.

After the microprocessor 101 has received the commands and address and/or data portion of the message, the computed BCH code is stored and the 7 bit BCH code generated by the CLC is received. The computed BCH code is compared to the receive BCH code to verify that no errors occurred in the serial transmission. If the BCH codes are not the same, the microprocessor 101 lights the BCH error (BCHERR) LED on the status indicator 117 and goes to a waiting condition.

If the message is valid, the RDC checks the remote unit address field against the address read from the address pack. If they are the same, the my address (MYADD) LED on the status indicator 117 is lit. Otherwise the microprocessor 101 goes to a waiting condition.

The microprocessor 101 determines the action to be taken by decoding the operational code portion of the received message. These actions are set forth in Table II which has been previously described.

To select a remote device, the RDC generally places the channel and point address of the remote device, as received, on the device bus. The RDC then pulses the command (CMD) line and checks for device selected (DS). If the device does not respond with DS, the RDC lights the device unavailable (DEV UNA) LED on the status indicator 117 and sets the device unavailable (DU) bit for transmission to the CLC.

If the DS line was set, the end of task (EOT) line will be checked. If the EOT line is not set, the RDC will wait 26.7 milliseconds for it to be set. If not set in that time, the RDC will light the device unavailable LED on the status indicator 117 and set the error (ERR) bit for transmission to the CLC. If DS and EOT are both set, the device is selected and the RDC may continue processing the operational code. The device will be deselected after the operational code has been processed.

When the operational code requires a write, the microprocessor 101 programs the direction of the device bus data line as outputs. The received data is placed on the lines and the IOW line is pulsed. When the operational code requires a read, the microprocessor 101 programs the direction of the device bus data lines as inputs. The IOR signal is set and the data is read and placed in the random access memory 108. The IOR line is then cleared.

When the operational code requires the RDC to return a message to the CLC, the microprocessor 101 sets the request to send (RTS) signal and waits for a clear to send (CTS) signal to be returned. The microprocessor 101 determines, from the received operational code, the number of bits to be transmitted of status, address or data. When the CTS signal is received by the RDC, the microprocessor 101 generates a sync pattern and transmits the requested data at the established baud rate. As each bit is being shifted on to the serial line, the microprocessor computes the BCH error detection code as has been previously described. The computed BCH error detection code is appended to the end of the transmission. When the transmission is complete, the microprocessor 101 clears the RTS signal, deselects the selected device and goes to a wait for sync condition.

Once the microprocessor has finished the job required by the operational code, it waits for the CLC to initiate another message. The microprocessor 101 enables the serial line activity to interrupt it. The microprocessor 101 will wait to be interrupted for about 10 microseconds. If the interrupt occurs within that period, the microprocessor 101 will time the sync bits to be within 0.375 bit time of the previous established baud rate. If the sync pattern is valid, the microprocessor will proceed to receive the serial message. If the sync pattern is not valid, the microprocessor will return to a wait for sync condition. If the serial line was inactive for over 10 milliseconds, the microprocessor 101 disables the serial line interrupt and proceeds to a wait for sync condition.

Referring now to FIGS. 5a and 5b, the microprocessor 51, illustrated in FIG. 2, includes the MC 6800 microprocessor 201 together with NAND gate 202 and 203 and the AND gate 204 which are interfaced as is illustrated in FIG. 5b. The microprocessor 51 is also considered to include the decoder 209, the inverters 205 and 207 and the AND gates 210a–210d all of which are illustrated in FIG. 5a.

The reset switch 81 is interfaced to the reset circuit 82 as is illustrated in FIG. 5b. The reset circuit 82 includes the timer 206 and the AND gate 208 as illustrated in FIG. 5b.

The microprocessor clock 52 is illustrated in FIG. 5a. The microprocessor clock 52 is preferably the 6870A MPU clock 301 wired as illustrated.

The read-only memory 57 is illustrated in FIG. 5a. The read-only memory 57 consists of two read-only memories 303 and 304 which are wired as illustrated in FIG. 5a.

Referring now to FIG. 5d, the status indicator 71 includes the LEDs 211–217, the drivers 219–223 and the AND gate 224 which are interfaced as illustrated in FIG. 5d. The baud rate pack 67 consists of the switch 230 which is wired as is illustrated in FIG. 5d. The flip-flop 76 is preferably two flip-flops 226 and 227 which are interfaced as is illustrated in FIG. 5d. The peripheral interface adapter 74 includes the peripheral interface adapter 231 together with the inverter 232 which are interfaced as is illustrated in FIG. 5d. The driver 235 constitutes one of the bus drivers 60 which are illustrated in FIG. 2.

Referring now to FIG. 5c, the random access memory 59 consists of one random access memory 305 which is wired as is illustrated in FIG. 5c. The output register file 61 consists of four registers 306–309. The registers 306–309 are interfaced as is illustrated in FIG. 5c. The input register files 62 consist of four registers 310–313. The input register files 310–313 are also interfaced as is illustrated in FIG. 5c.

Referring now to FIGS. 5e and 5f, the inverter 241 and the NAND gate 242 form part of the ATN detector circuit 50. The serial interface 69 is made up of the line receiver 244, the line driver 245 and the line driver 246, together with the AND gate 248 and the inverter 247. The tri-state inverters 251 and 252 make up the remaining part of the bus driver 60. The address pack 65 consists of a switch 254 which is wired as is illustrated in FIG. 5e. The remaining portion of the ATN bit detector 50 is made up of multiplexers 261 and 262 together with NAND gates 264 and 265, NAND gate 266 and the inverter 267. The address decoder 264 is made up of the comparator 271 and the decoder 272 together with the tri-state inverter 273–276, the NAND gates 281–290, the inverters 292–296 and the NAND gate 298. The local device controller 200 is utilized to interface the CLC to the central computer 112. The local device controller is part of the Optrol 3600 system manufactured by Applied Automation Inc., Bartlesville, Okla. The central computer 112 is the Interdata Model 716, 732 or 832 manufactured by Perkin-Elmer Data Systems.

Commercially available components which can be utilized in the circuit illustrated in FIGS. 5a–f are as follows:

| | | |
|---|---|---|
| Microprocessor 201 | MC6800 | Motorola Semiconductor |
| Reset switch 81 | 39250 | Grayhill |
| LEDs 211-217 | TIL210 | Texas Instruments |
| Drivers 219-223 and 235 | 7407 | National Semiconductor |
| Switches 230 and 254 | AMP 53137-1 | AMP |
| Flip-flops 226 and 227 | 74LS74 | National Semiconductor |
| Peripheral interface adapter 231 | MC6820 | Motorola Semiconductor |
| Line receiver 244 | AM26LS32 | Advanced Microdevices |
| Line driver 245 | MC3487 | Motorola Semiconductor |
| Line driver 246 | 9616 | Fairchild Semiconductor |
| Multiplexers 261 and 262 | 74LS151 | National Semiconductor |
| Comparator 271 | 74LS85 | National Semiconductor |
| Decoder 272 | 74LS138 | National Semiconductor |
| MPU Clock 301 | MC6870A | Motorola Semiconductor |
| Read-only Memories 303 & 304 | 93448 | Fairchild Semiconductor |
| Ramdom access memory 59 | MC6810 | Motorola Semiconductor |
| Registers 306-309 | 74LS170 | National Semiconductor |
| Registers 310-313 | 74LS670 | National Semiconductor |
| NAND gates 202,203, 242,266, and 298 | 74LS10 | National Semiconductor |
| AND gates 204,208,224 and 248 | 74LS08 | National Semiconductor |
| Inverters 232,207,205, 241,247,267, and 292-296 | 74LS04 | National Semiconductor |
| Tri-state inverters 251, 252, and 273-276 | 74LS367 | National Semiconductor |
| NAND gates 210a,b,c & d, 264,265 and 281-290 | 74LS00 | National Semiconductor |

A schematic diagram of the remote device controller illustrated in FIG. 4 is illustrated in FIGS. 7a-7c. FIG. 8 illustrates the manner in which FIGS. 7a-7c should be put together to make a complete schematic of the remote device controller illustrated in FIG. 4.

Referring now to FIG. 7a, the microprocessor clock 104 consists of the MC6870a clock 401 which is manufactured by Motorola Semiconductor. The 6870a clock 401 is wired as is illustrated. The microprocessor 101 consists of the MC6800 microprocessor chip 402 and the AND gate 403 together with the associated wiring illustrated. The read-only memory 106 consists of two programmable read-only memories 405 and 406 together with the inverters 407 and 408. The random access memory 108 consists of one random access memory 411 wired as is illustrated. The address pack 14 consists of the switching circuit 413, the tri-state buffers 414-418, the NAND gate 419 and the AND gate 420. All of the electrical components are interfaced as is illustrated.

Referring now to FIGS. 7b and 7c, the status indicators 117 consist of the light emitting diodes 422-427 together with the tri-state buffers 429-434. The tri-state buffers and the LEDs are interfaced as is illustrated. The reset switch 118 is interfaced to the reset circuit 120. The reset circuit 120 consists of the timer 441 together with the AND gate 442. The timer and the AND gate are interfaced as is illustrated. The peripheral interface adapter 111 is made up of the peripheral interface adapter 445, the inverter 446 and the NAND gate 447. The peripheral interface adapter 112 consists of the peripheral interface adapter 451 together with the inverter 452. The serial interface 115 consists of the two line drivers 355 and 356 together with the line receiver 357, the AND gate 358 and the inverter 359.

Electrical components which can be utilized in the circuit illustrated in FIGS. 7a-7c are as follows:

| | | |
|---|---|---|
| Clock 401 | MC6870A | Motorola Semiconductor |
| Microprocessor 402 | MC6800 | Motorola Semiconductor |
| Read-only memory 405 & 406 | 93448 | Fairchild Semiconductor |
| Random access memory 411 | MC6810 | Motorola Semiconductor |
| LEDs 422-428 | TIL210 | Texas Instruments |
| Reset switch 118 | 39250 | Grayhill |
| Timer 441 | NE555 | Signetics |
| Peripheral interface adapters 445 & 451 | MC6820 | Motorola Semiconductor |
| Line driver 356 | MC3487 | Motorola Semiconductor |
| Line driver 355 | 9616 | Fairchild Semiconductor |
| Line receiver 357 | AM26LS32 | Advanced Microdevices |
| AND gates 403,420,442 & 358 | 74LS08 | National Semiconductor |
| Inverters 407,408,446,452 and 359 | 74LS04 | National Semiconductor |
| NAND gate 419 and 447 | 74LS20 | National Semiconductor |
| Tri-state buffers 414-418 and 429-434 | 74LS367 | National Semiconductor |

The heart of the CLC is the microprocessor 51. In like manner, the heart of the RDC is the microprocessor 101. Many different types of software programs could be in different languages and formats which would allow the microprocessors 51 and 101 to carry out their required functions. While many different software programs could be developed to allow the computers 51 and 101 to accomplish their required functions, a preferred software program for the CLC illustrated in FIG. 2 is attached to the present application. A preferred software program for the RDC illustrated in FIG. 4 is attached to the present application. The software programs employ a standard language developed by Motorola Semiconductor for the 6800 microprocessor. Various steps in the program are defined and the language is defined in extensive documentation that is provided by Motorola Semiconductor for the 6800 microprocessor.

Specific references are the "6800 Microprocessor Programming Manual" (1976) and "Microprocessor Course" (1976) both of which are provided by Motorola Semiconductor.

The following example is provided to further illustrate the present invention.

EXAMPLE

Ten remotes located from Houston to Chicago need to be updated every second. The remotes are to be connected into a central computer at Bartlesville, Okla., using a leased telephone line. The bit rate is limited to 1200 bits/second due to the use of frequency shift keying modems. The transmission of data is half duplex, that is, only one communication device can talk at any one time. The Chicago remote, being the most distant, will not always respond to 1200 bits/second, but will respond to 600 bits/second. All of the other remotes function well at 1200 bits/second. The message required to update each remote and the response of the remote require 72 bits of information.

If prior art systems were utilized, all of the remotes would have to be strapped to 600 bits/second to be compatible with the Chicago remote. The line use time is computed as follows:

600 bits/second=0.001667 seconds/bit 72 bits/remote×0.101667 seconds/bit×10 remotes=1.2 seconds The line use time thus exceeds the required update cycle time of 1 second. To solve this problem, two telephone lines could be leased, one to service the Chicago remote and one to service the other nine remotes. This also requires two communication line controllers and two modems at the central computer site.

Utilizing the present invention, the CLC would be strapped to a prime rate of 1200 bits/second. When the Chicago remote would not communicate at 1200 bits/second, the CLC will automatically shift to 600 bits/second. After communicating with the Chicago remote at 600 bits/second, the CLC will shift back to 1200 bits/second to update the other remotes. The worse case line use time would be computed as follows:

1200 bits per second = 0.000833 seconds per bit. The line use time for nine remotes is:

$$72 \frac{\text{bits}}{\text{remote}} \times 0.000833 \frac{\text{sec}}{\text{bit}} \times 9 \text{ remotes} = 0.539784 \text{ seconds}$$

When the Chicago remote causes errors at 1200 bits per second, the third try requires:

$$72 \frac{\text{bits}}{\text{remote}} \times 0.001667 \text{ sec} \times 1 \text{ remote} = 0.120024 \text{ seconds}$$

The total line use time is the sum of all tries:

| | |
|---|---|
| Remotes 1–9 | 0.539784 sec |
| Chicago remote 1st try | 0.059976 sec |
| Chicago remote 2nd try | 0.059976 sec |
| Chicago remote 3rd try | 0.120024 sec |
| Total | 0.779760 sec |

The line use time is well under the one second update time required.

A single telephone line will support all remotes.

Comparing both solutions, there is a savings in the initial cost of one communication line controller and one modem at the central site. Although this is significant, the cost of leasing two telephone lines compared to one could amount to over $6,000 per year.

Another factor which must be considered when computing line use times is the time used for retransmission because of errors occurring in the first nine remotes. Since the CLC retries automatically, no computer interrupt times need to be considered. The time for retransmission would be only 0.059976 seconds. Several retry times could be added to the line use time of the second solution without exceeding the one second update cycle time.

The invention has been described in terms of a preferred embodiment in which detailed schematics of the CLC and the RDC's have been set forth. The invention is not limited to these detailed schematics. It is well known that there are many circuit configurations which can be utilized to perform specified functions. This is especially true with regard to many elements in the circuits which may be supplied by a plurality of manufacturers.

While the invention has been described in terms of the presently preferred embodiment, reasonable variations and modifications are possible by those skilled in the art within the scope of the described invention and the appended claims.

That which is claimed is:

1. A method for increasing throughput for a communication system utilizing a serial communication line comprising the steps of:
   transmitting a message on said serial communication line, at a prime baud rate, from a central station to a remote station;
   automatically detecting the baud rate at which said message was transmitted and checking said message for errors at said remote station;
   ignoring said message if said message contains at least a first predetermined number of errors;
   completing the action required by said message if said message does not contain at least said first predetermined number of errors;
   transmitting a reply message on said serial communication line, at said prime baud rate, from said remote station to said central station if said message did not contain at least said first predetermined number of errors;
   checking said reply message for errors at said central station; and
   retransmitting said message on said serial communication line, at a secondary baud rate lower than said primary baud rate, from said central station to said remote station if said remote station did not reply to said message or if said reply message contained at least a second predetermined number of errors.

2. A method in accordance with claim 1 additionally comprising the steps of:
   automatically determining the baud rate at which the message transmitted at said secondary baud rate was transmitted and checking the message transmitted at said secondary baud rate for errors at said remote station;
   ignoring the message transmitted at said secondary baud rate if the message transmitted at said secondary baud rate contains at least said first predetermined number of errors;
   completing the action required by the message transmitted at said secondary baud rate if the message transmitted at said secondary baud rate does not contain at least said first predetermined number of errors; and
   transmitting a reply message, to the message transmitted at said secondary baud rate, on said serial communication line, at said secondary baud rate, from said remote station to said central station if the message transmitted at said secondary baud rate did not contain at least said first predetermined number of errors.

3. A method in accordance with claim 2 wherein said first predetermined number of errors is one error and said second predetermined number of errors is one error.

4. A method in accordance with claim 1 wherein said step of automatically determining the baud rate at said remote station comprises:
   timing the duration of sync pulses associated with the messages transmitted from said central station; and
   deriving the baud rate based on the duration of said sync pulses.

5. A method in accordance with claim 1 wherein said prime baud rate is 1200 baud and said secondary baud rate is 600 baud.

6. A method in accordance with claim 1 wherein said step of checking said message for errors at said remote station comprises:

generating a Bose'-Chauduri (BCH) cyclic error detection character as said message is transmitted from said central station;

generating a BCH cyclic error detection character as said message is received at said remote station; and comparing the BCH cyclic error detection character generated as said message was received to the BCH cyclic error detection character which was generated at said central station and transmitted with said message.

7. A method in accordance with claim 6 wherein said step of checking said reply message for errors at said central station comprises:

generating a BCH cyclic error detection character as said reply message is transmitted from said remote station;

generating a BCH cyclic error detection character as said reply message is received at said central station; and comparing the BCH cyclic error detection character generated as said reply message was received to the BCH cyclic error detection character which was generated at said remote station and transmitted with said reply message.

8. A method for increasing throughput for a communication system utilizing a serial communication line comprising the steps of:

transmitting a message on said serial communication line, at a prime baud rate, from a central station to a remote station;

automatically detecting the baud rate at which said message was transmitted and checking said message for errors at said remote station;

ignoring said message if said message contains at least a first predetermined number of errors;

completing the action required by said message if said message does not contain at least said first predetermined number of errors;

transmitting a reply message on said serial communication line, at said prime baud rate, from said remote station to said central station if said message did not contain at least said first predetermined number of errors;

checking said reply message for errors at said central station;

retransmitting said message on said serial communication line, at said prime baud rate, from said central station to said remote station if said remote station did not reply to said message or if said reply message contained at least a second predetermined number of errors;

automatically detecting the baud rate at which the retransmitted message was transmitted and checking said retransmitted message for errors at said remote station;

ignoring said retransmitted message if said retransmitted message contains at least said first predetermined number of errors;

completing the action required by said retransmitted message if said retransmitted message does not contain at least said first predetermined number of errors;

retransmitting said reply message on said serial communication line, at said prime baud rate, from said remote station to said central station if said retransmitted message did not contain at least said first predetermined number of errors;

checking the retransmitted reply message for errors at said central station;

retransmitting said message on said serial communication line, at a secondary baud rate lower than said primary baud rate, from said central station to said remote station if said remote station did not reply to said retransmitted message or if said retransmitted reply message contained at least said second predetermined number of errors.

9. A method in accordance with claim 8 additionally comprising the steps of:

automatically determining the baud rate at which the message transmitted at said secondary baud rate was transmitted and checking the message transmitted at said secondary baud rate for errors at said remote station;

ignoring the message transmitted at said secondary baud rate if the message transmitted at said secondary baud rate contains at least said first predetermined number of errors;

completing the action required by the message transmitted at said secondary baud rate if the message transmitted at said secondary baud rate does not contain at least said first predetermined number of errors; and transmitting a reply message, to the message transmitted at said secondary baud rate, on said serial communication line, at said secondary baud rate, from said remote station to said central station if the message transmitted at said secondary baud rate did not contain at least said first predetermined number of errors.

10. A method in accordance with claim 9 wherein said first predetermined number of errors is one error and said second predetermined number of errors is one error.

11. A method in accordance with claim 8 wherein said step of automatically determining the baud rate at said remote station comprises:

timing the duration of sync pulses associated with the messages transmitted from said central station; and deriving the baud rate based on the duration of said sync pulses.

12. A method in accordance with claim 8 wherein said prime baud rate is 1200 baud and said secondary baud rate is 600 baud.

13. A method in accordance with claim 8 wherein said step of checking said message for errors at said remote station comprises:

generating a BCH cyclic error detection character as said message is transmitted from said central station;

generating a BCH cyclic error detection character as said message is received at said remote station; and comparing the BCH cyclic error detection character generated as said message was received to the BCH cyclic error detection character which was generated at said central station and transmitted with said message.

14. A method in accordance with claim 13 wherein said step of checking said reply message for errors at said central station comprises:

generating a BCH cyclic error detection character as said message is transmitted from said remote station;

generating a BCH cyclic error detection character as said reply message is received at said central station; and comparing the BCH cyclic error detection character generated as said reply message was received to the BCH cyclic error detection character which was generated at said remote station and transmitted with said reply message.

15. A method for increasing throughput for a communication system in which a plurality of remote stations which must be periodically updated are connected to a central station via a serial communication line comprising the steps of:
(a) transmitting a message on said serial communication line, at a prime baud rate, from said central station to one of said plurality of remote stations;
(b) automatically detecting the baud rate at which said message was transmitted and checking said message for errors at said one of said plurality of remote stations;
(c) ignoring said message if said message contains at least a predetermined number of errors;
(d) completing the action required by said message if said message does not contain at least said predetermined number of errors;
(e) transmitting a reply message on said serial communication line, from said one of said plurality of remote stations to said central station if said message did not contain at least said predetermined number of errors;
(f) checking said reply message for errors at said central station;
(g) retransmitting said message on said serial communication line, at a secondary baud rate lower than said primary baud rate, from said central station to said one of said plurality of remote stations if one of said plurality of said remote stations did not reply to said message or if said reply message contained at least a second predetermined number of errors; and
(h) repeating steps (a)–(g) until all said plurality of remote stations have been updated and
(i) periodically repeating steps (a)–(h).

16. A method in accordance with claim 15 additionally comprising the steps of:
(j) automatically determining the baud rate at which the message transmitted at said secondary baud rate was transmitted and checking the message transmitted at said secondary baud rate for errors at said one of said plurality of remote stations;
(k) ignoring the message transmitted at said secondary baud rate if the message transmitted at said secondary baud rate contains at least said first predetermined number of errors;
(l) completing the action required by the message transmitted at said secondary baud rate if the message transmitted at said secondary baud rate does not contain at least said first predetermined number of errors;
(m) transmitting a reply message, to the message transmitted at said secondary baud rate, on said serial communication line, at said secondary baud rate, from said one of said plurality of remote stations of said central station if the message transmitted at said secondary baud rate did not contain at least said first predetermined number of errors;
(n) repeating steps (a)–(g) and (j)–(m) until all said plurality of remote stations have been updated; and periodically repeating steps (a)–(g) and (j)–(n).

17. A method in accordance with claim 16 wherein said first predetermined number of errors is one error and said second predetermined number of errors is one error.

18. A method in accordance with claim 15 wherein said step of automatically determining the baud rate at said one of said plurality of remote stations comprises:
timing the duration of sync pulses associated with the messages transmitted from said central station; and
deriving the baud rate based on the duration of said sync pulses.

19. A method in accordance with claim 15 wherein said prime baud rate is 1200 baud and said secondary baud rate is 600 baud.

20. A method in accordance with claim 15 wherein said step of checking said message for errors at said remote station comprises:
generating a Bose'-Chauduri (BCH) cyclic error detection character as said message is transmitted from said central station;
generating a BCH cyclic error detection character as said message is received at said remote station; and
comparing the BCH cyclic error detection character generated as said message was received to the BCH cyclic error detection character which was generated at said central station and transmitted with said message.

21. A method in accordance with claim 20 wherein said step of checking said reply message for errors at said central station comprises:
generating a BCH cyclic error detection character as said reply message is transmitted from said remote station;
generating a BCH cyclic error detection character as said reply message is received at said central station; and
comparing the BCH cyclic error detection character generated as said reply message was received to the BCH cyclic error detection character which was generated at said remote station and transmitted with said reply message.

22. A method for increasing throughput for a communication system in which a plurality of remote stations which must be periodically updated are connected to a central station via a serial communication line comprising the steps of:
(a) transmitting a message on said serial communication line, at a prime baud rate, from said central station to one of said plurality of remote stations;
(b) checking said message for errors at said one of said plurality of remote stations;
(c) ignoring said message if said message contains at least a first predetermined number of errors;
(d) completing the action required by said message if said message does not contain at least said first predetermined number of errors;
(e) transmitting a reply message on said serial communication line, at said prime baud rate, from said one of said plurality of remote stations to said central station if said message did not contain at least said first predetermined number of errors;
(f) checking said reply message for errors at said central station;
(g) retransmitting said message on said serial communication line, at said prime baud rate, from said central station to said one of said plurality of remote stations if said one of said plurality of remote stations did not reply to said message or if said reply message contained at least a second predetermined number of errors;

(h) checking the retransmitted message for errors at said one of said plurality of remote stations;

(i) ignoring said retransmitted message if said retransmitted message contains at least said first predetermined number of errors;

(j) completing the action required by said retransmitted message if said retransmitted message does not contain at least said first predetermined number of errors;

(k) retransmitting a reply message on said serial communication line, at said primary baud rate, from said one of said plurality of remote stations to said central station if said retransmitted message did not contain at least said first predetermined number of errors;

(l) checking the retransmitted reply message for errors at said central station;

(m) retransmitting said message on said serial communication line, at a secondary baud rate lower than said primary baud rate, from said central station to said one of said plurality of remote stations if said one of said plurality of remote stations did not reply to said retransmitted message or if said retransmitted reply message contained at least said second predetermined number of errors;

(n) repeating steps (a)-(m) with the message from the central station being transmitted to a different one of said plurality of remote stations until all of said plurality of remote stations have been updated; and (o) periodically repeating steps (a)-(n).

23. A method in accordance with claim 22 additionally comprising the steps of:

(p) automatically determining the baud rate at which the message transmitted at said secondary baud rate was transmitted and checking the message transmitted at said secondary baud rate for errors at said one of said plurality of remote stations;

(q) ignoring the message transmitted at said secondary baud rate if the message transmitted at said secondary baud rate contains at least said first predetermined number of errors;

(r) completing the action required by the message transmitted at said secondary baud rate if the message transmitted at said secondary baud rate does not contain at least said first predetermined number of errors;

(s) transmitting a reply message, to the message transmitted at said secondary baud rate, on said serial communication line, at said secondary baud rate, from said one of said plurality of remote stations to said central station if the message transmitted at said secondary baud rate did not contain at least said first predetermined number of errors;

(t) repeating steps (a)-(m) and (p)-(s) until all said plurality of remote stations have been updated; and periodically repeating steps (a)-(m) and (p)-(t).

24. A method in accordance with claim 23 wherein said first predetermined number of errors is one error and said second predetermined number of errors is one error.

25. A method in accordance with claim 22 wherein said step of automatically determining the baud rate at said one of said plurality of remote stations comprises:
timing the duration of sync pulses associated with the messages transmitted from said central station; and
deriving the baud rate based on the duration of said sync pulses.

26. A method in accordance with claim 22 wherein said prime baud rate is 1200 baud and said secondary baud rate is 600 baud.

27. A method in accordance with claim 22 wherein step of checking said message for errors at said remote station comprises:
generating a Bose'-Chauduri (BCH) cyclic error detection character as said message is transmitted from said central station;
generating a BCH cyclic error detection character as said message is received at said remote station; and
comparing the BCH cyclic error detection character generated as said message was received to the BCH cyclic error detection character which was generated at said central station and transmitted with said message.

28. A method in accordance with claim 27 wherein said step of checking said reply message for errors at said central station comprises:
generating a BCH cyclic error detection character as said reply message is transmitted from said remote station;
generating a BCH cyclic error detection character as said reply message is received at said central station; and
comparing the BCH cyclic error detection character generated as said reply message was received to the BCH cyclic error detection character which was generated at said remote station and transmitted with said reply message.

* * * * *